United States Patent
Fawcett

(10) Patent No.: US 10,341,189 B2
(45) Date of Patent: * Jul. 2, 2019

(54) OPERATOR FUSION MANAGEMENT IN A STREAM COMPUTING ENVIRONMENT

(71) Applicant: International Business Machines Corporation, Armonk, NY (US)

(72) Inventor: Bradley W. Fawcett, Byron, MN (US)

(73) Assignee: International Business Machines Corporation, Armonk, NY (US)

( * ) Notice: Subject to any disclaimer, the term of this patent is extended or adjusted under 35 U.S.C. 154(b) by 329 days.

This patent is subject to a terminal disclaimer.

(21) Appl. No.: 15/273,666

(22) Filed: Sep. 22, 2016

(65) Prior Publication Data
US 2018/0083839 A1 Mar. 22, 2018

(51) Int. Cl.
H04L 12/24 (2006.01)
H04L 12/26 (2006.01)
H04L 29/06 (2006.01)

(52) U.S. Cl.
CPC .......... *H04L 41/12* (2013.01); *H04L 41/0813* (2013.01); *H04L 41/20* (2013.01); *H04L 43/0876* (2013.01); *H04L 69/16* (2013.01); *H04L 43/16* (2013.01)

(58) Field of Classification Search
CPC .............. G06F 11/1433; G06F 11/3006; G06F 17/30516; G06F 2209/5017; G06F 8/20; G06F 8/433; G06F 8/443; G06F 9/44505; G06F 9/505; G06F 9/5066; G06F 9/5083; H04L 41/0816; H04L 41/12; H04L 41/20; H04L 41/5054; H04L 43/08; H04L 65/80; H04L 67/1008; H04L 69/16
See application file for complete search history.

(56) References Cited

U.S. PATENT DOCUMENTS

| | | |
|---|---|---|
| 8,239,534 B1 | 8/2012 | Fall et al. |
| 8,327,337 B2 | 12/2012 | Barsness et al. |
| 8,407,360 B2 | 3/2013 | Andrade et al. |
| 8,868,963 B2 | 10/2014 | Fawcett |
| 8,898,505 B2 | 11/2014 | Fawcett |
| 9,298,485 B2 | 3/2016 | Bragstad et al. |

(Continued)

FOREIGN PATENT DOCUMENTS

JP 5656781 B2 1/2015

OTHER PUBLICATIONS

International Business Machines Corporation; "IBM InfoSphere Streams Version 4.1.1: Operators: spl 1.2.1"; <http://www.ibm.com/support/knowledgecenter/SSCRJU_4.1.1/com.ibm.streams.toolkits.doc/spldoc/dita/tk$spl/ix$Operator.html>.

(Continued)

*Primary Examiner* — Christopher Biagini
(74) *Attorney, Agent, or Firm* — Robert C. Bunker

(57) ABSTRACT

Disclosed aspects relate to operator fusion management in a stream computing environment. A topology model which indicates a set of stream operators, a set of connections between the set of stream operators, and a set of stream operator attributes for the set of stream operators may be established. Based on the topology model, a set of operator fusion management operations to combine the set of stream operators into a set of processing elements may be determined. The set of processing elements may be constructed by performing the set of operator fusion management operations.

19 Claims, 12 Drawing Sheets

(56) References Cited

U.S. PATENT DOCUMENTS

| | | | | |
|---|---|---|---|---|
| 2009/0007116 | A1* | 1/2009 | Duffy | G06F 17/30445 718/100 |
| 2009/0300615 | A1* | 12/2009 | Andrade | G06F 9/5066 718/100 |
| 2010/0293535 | A1* | 11/2010 | Andrade | G06F 8/433 717/156 |
| 2011/0061060 | A1* | 3/2011 | Andrade | G06F 9/5066 719/313 |
| 2012/0324453 | A1* | 12/2012 | Chandramouli | G06F 17/30516 718/100 |
| 2013/0091507 | A1* | 4/2013 | Wu | G06F 9/5038 718/104 |
| 2013/0198318 | A1* | 8/2013 | Branson | G06F 9/44 709/217 |
| 2014/0059212 | A1* | 2/2014 | Gedik | G06F 9/5066 709/224 |
| 2014/0278337 | A1* | 9/2014 | Branson | G06F 11/3457 703/22 |
| 2014/0289240 | A1* | 9/2014 | Barsness | G06F 17/30516 707/736 |
| 2015/0254094 | A1* | 9/2015 | Cao | G06F 9/4856 718/1 |
| 2015/0334143 | A1 | 11/2015 | Branson et al. | |
| 2016/0378566 | A1 | 12/2016 | Barsness et al. | |
| 2016/0381129 | A1* | 12/2016 | Barsness | G06F 9/5083 709/226 |
| 2017/0060538 | A1 | 3/2017 | Barsness et al. | |
| 2017/0235555 | A1 | 8/2017 | Cook et al. | |
| 2018/0077214 | A1 | 3/2018 | Fawcett | |

OTHER PUBLICATIONS

Hirzel et al. (2014). A catalog of stream processing optimizations. ACM Computing Surveys (CSUR), 46(4), 46.

Jain et al. (Jun. 2004). Adaptive stream resource management using kalman filters. In Proceedings of the 2004 ACM SIGMOD international conference on Management of data. pp. 11-22.

Karnok, "Operator-Fusion (Part 1)," Advanced Reactive Java, Mar. 11, 2016, p. 1-7, http://akarnokd.blogspot.com/2016/03/operator-fusion-part-1.html, Accessed on Mar. 27, 2018.

IBM, "List of IBM Patents or Patent Applications Treated as Related (Appendix P)," Apr. 6, 2018, p. 1-2.

Fawcett, "Operator Fusion Management In A Stream Computing Environment," Application and Drawings, Filed on Dec. 27, 2017, 69 Pages, U.S. Appl. No. 15/855,316.

* cited by examiner

Table 1200

| Constraints | Node-Level: Fusing considerations |
|---|---|
| Partition co-location | Must be fused with group nodes |
| Partition ex-location | Can NOT be fused with group nodes |
| Partition isolate | Can NOT be fused with any other node |
| Host co-location | n/a |
| Host ex-locate | Can NOT be fused with group nodes |
| Host isolate | n/a |
| Restartable / relocatable | Must match? Ability to relax constraints? |
| Host placement constraints | - matching hostpool specifications<br>- matching specific hosts |
| Hostpool w/index | Can NOT be fused with node with hostpool & different index |
| Execution instructions | Can NOT be fused with incompatible env vars?? |

FIG. 12

OPERATOR FUSION MANAGEMENT IN A STREAM COMPUTING ENVIRONMENT

BACKGROUND

This disclosure relates generally to computer systems and, more particularly, relates to operator fusion management in a stream computing environment. The amount of stream computing data that needs to be managed by enterprises is increasing. Management of stream computing environments may be desired to be performed as efficiently as possible. As stream computing data needing to be managed increases, the need for efficient operator fusion management in a stream computing environment may increase.

SUMMARY

Aspects of the disclosure relate to operator fusion management in a stream computing environment. A set of stream operators of a topology model may be fused using a set of operator fusion management operators to create a set of processing elements. The set of operator fusion management operations may be determined based on a variety of factors. Operator fusion management decisions may be based on deployment cluster characteristics, user motivations, application characteristics, fusion cycle result evaluations, application load conditions or other factors. One or more components may evaluate the heuristics and factors that affect stream operator fusion, and determine the set of operator fusion management operations to combine the set of stream operators into the set of processing elements. Leveraging operator fusion management techniques may be associated with various benefits such as data processing efficiency, stream application performance, or the like.

Disclosed aspects relate to operator fusion management in a stream computing environment. A topology model which indicates a set of stream operators, a set of connections between the set of stream operators, and a set of stream operator attributes for the set of stream operators may be established. Based on the topology model, a set of operator fusion management operations to combine the set of stream operators into a set of processing elements may be determined. The set of processing elements may be constructed by performing the set of operator fusion management operations.

The above summary is not intended to describe each illustrated embodiment or every implementation of the present disclosure.

BRIEF DESCRIPTION OF THE SEVERAL VIEWS OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

FIG. 12 is a diagram illustrating a table of example fusion constraints for stream operation fusion management, according to embodiments.

Figure 1:
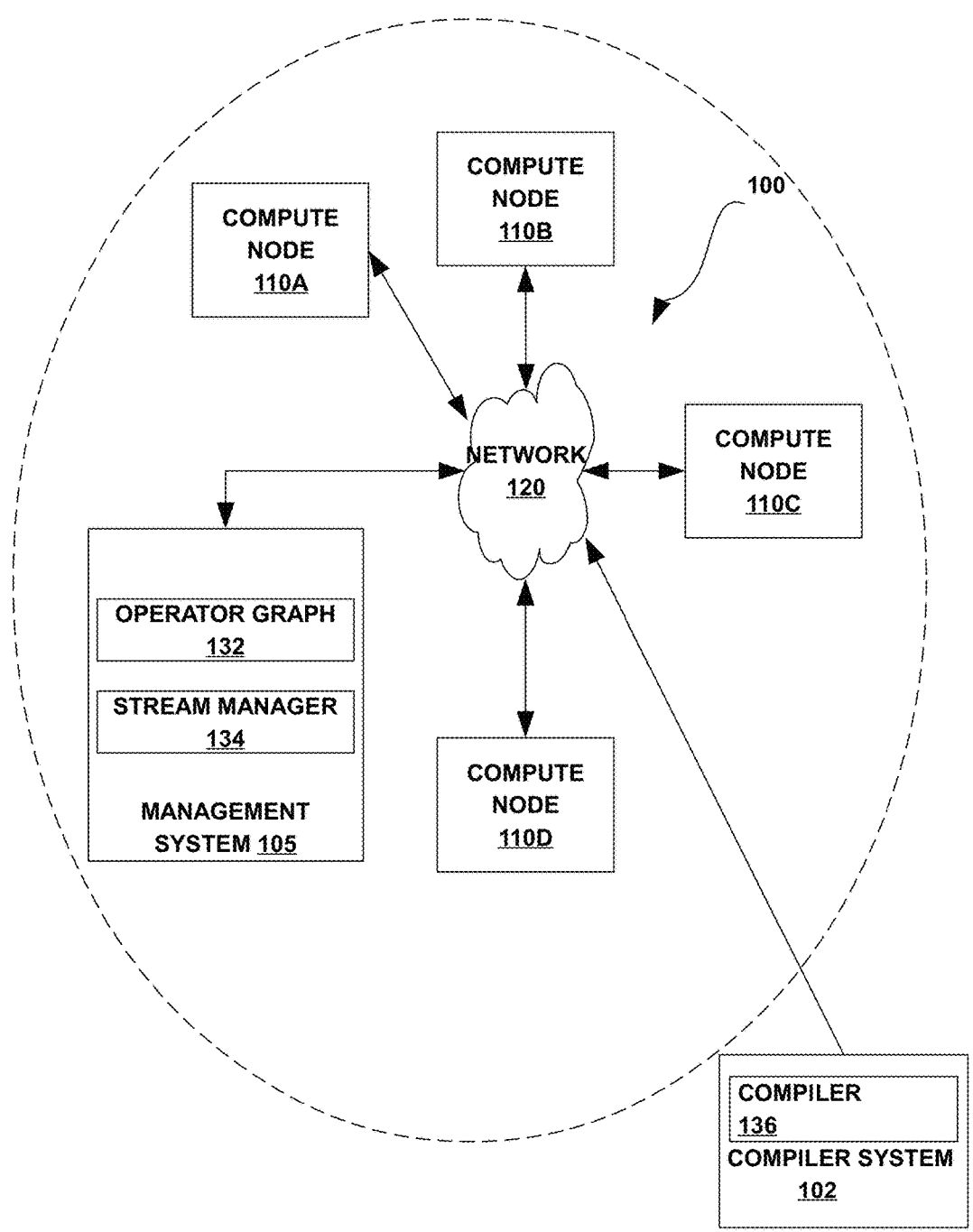
FIG. 1 illustrates an exemplary computing infrastructure to execute a stream computing application according to embodiments.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the disclosure relate to operator fusion management in a stream computing environment. A set of stream operators of a topology model (e.g., operator graph) may be fused using a set of operator fusion management operators to create a set of processing elements. The set of operator fusion management operations may be determined based on a variety of factors (e.g., rules, heuristics). Operator fusion management decisions may be based on deployment cluster characteristics (e.g., size and number of hosts), user motivations (e.g., target number of processing elements), application characteristics (e.g., developer expressed constraints), fusion cycle result evaluations (e.g., prediction of operator fusion outcomes), application load conditions (e.g., host resources available for processing elements) or other factors. A composer (e.g., fusion management engine) may evaluate the heuristics and factors that affect stream operator fusion, and determine the set of operator fusion management operations to combine the set of stream operators into the set of processing elements. Leveraging operator fusion management techniques may be associated with various benefits such as data processing efficiency, stream application performance, or the like.

Stream-based computing and stream-based database computing are emerging as a developing technology for database systems. Products are available which allow users to create applications that process and query streaming data before it reaches a database file. With this emerging technology, users can specify processing logic to apply to inbound data records while they are "in flight," with the results available in a very short amount of time, often in fractions of a second. Constructing an application using this type of processing has opened up a new programming paradigm that will allow for development of a broad variety of innovative applications, systems, and processes, as well as present new challenges for application programmers and database developers.

In a stream computing application, stream operators are connected to one another such that data flows from one stream operator to the next (e.g., over a TCP/IP socket). When a stream operator receives data, it may perform operations, such as analysis logic, which may change the tuple by adding or subtracting attributes, or updating the values of existing attributes within the tuple. When the analysis logic is complete, a new tuple is then sent to the next stream operator. Scalability is achieved by distributing an application across nodes by creating executables (i.e., processing elements), as well as replicating processing elements on multiple nodes and load balancing among them. Stream operators in a stream computing application can be fused together to form a processing element that is executable. Doing so allows processing elements to share a common process space, resulting in much faster communication between stream operators than is available using inter-process communication techniques (e.g., using a TCP/IP socket). Further, processing elements can be inserted or removed dynamically from an operator graph representing the flow of data through the stream computing application. A particular stream operator may not reside within the same operating system process as other stream operators. In addition, stream operators in the same operator graph may be hosted on different nodes, e.g., on different compute nodes or on different cores of a compute node.

Data flows from one stream operator to another in the form of a "tuple." A tuple is a sequence of one or more attributes associated with an entity. Attributes may be any of a variety of different types, e.g., integer, float, Boolean, string, etc. The attributes may be ordered. In addition to attributes associated with an entity, a tuple may include metadata, i.e., data about the tuple. A tuple may be extended by adding one or more additional attributes or metadata to it. As used herein, "stream" or "data stream" refers to a sequence of tuples. Generally, a stream may be considered a pseudo-infinite sequence of tuples.

Tuples are received and output by stream operators and processing elements. An input tuple corresponding with a particular entity that is received by a stream operator or processing element, however, is generally not considered to be the same tuple that is output by the stream operator or processing element, even if the output tuple corresponds with the same entity or data as the input tuple. An output tuple need not be changed in some way from the input tuple.

Nonetheless, an output tuple may be changed in some way by a stream operator or processing element. An attribute or metadata may be added, deleted, or modified. For example, a tuple will often have two or more attributes. A stream operator or processing element may receive the tuple having multiple attributes and output a tuple corresponding with the input tuple. The stream operator or processing element may only change one of the attributes so that all of the attributes of the output tuple except one are the same as the attributes of the input tuple.

Generally, a particular tuple output by a stream operator or processing element may not be considered to be the same tuple as a corresponding input tuple even if the input tuple is not changed by the processing element. However, to simplify the present description and the claims, an output tuple that has the same data attributes or is associated with the same entity as a corresponding input tuple will be referred to herein as the same tuple unless the context or an express statement indicates otherwise.

Stream computing applications handle massive volumes of data that need to be processed efficiently and in real time. For example, a stream computing application may continuously ingest and analyze hundreds of thousands of messages per second and up to petabytes of data per day. Accordingly, each stream operator in a stream computing application may be required to process a received tuple within fractions of a second. Unless the stream operators are located in the same processing element, it is necessary to use an inter-process communication path each time a tuple is sent from one stream operator to another. Inter-process communication paths can be a critical resource in a stream computing application. According to various embodiments, the available bandwidth on one or more inter-process communication paths may be conserved. Efficient use of inter-process communication bandwidth can speed up processing.

A streams processing job has a directed graph of processing elements that send data tuples between the processing elements. The processing element operates on the incoming tuples, and produces output tuples. A processing element has an independent processing unit and runs on a host. The streams platform can be made up of a collection of hosts that are eligible for processing elements to be placed upon. When a job is submitted to the streams run-time, the platform scheduler processes the placement constraints on the processing elements, and then determines (the best) one of these candidates host for (all) the processing elements in that job, and schedules them for execution on the decided host.

Aspects of the disclosure include a method, system and computer program product for operator fusion management in a stream computing environment. A topology model which indicates a set of stream operators, a set of connections between the set of stream operators, and a set of stream operator attributes for the set of stream operators may be established. Based on the topology model, a set of operator fusion management operations to combine the set of stream operators into a set of processing elements may be determined. By performing the set of operator fusion management operations, the set of processing elements may be constructed.

In embodiments, determining the set of operator fusion management operations based on the topology model may include using a set of deployment cluster characteristics. The set of deployment cluster characteristics may include both a compute host quantity factor and a compute host size factor. In embodiments, determining the set of operator fusion management operations based on the topology model may include using a fusion tightness factor. In embodiments, determining the set of operator fusion management operations based on the topology model may include using a set of application characteristics. The set of application characteristics may indicate a stream operator co-location criterion, a stream operator ex-location criterion, a stream operator isolation criterion, a stream operator count, and a constraint complexity factor. In embodiments, determining the set of operator fusion management operations based on the topology model may include using a set of historical data associated with a set of parameters of the set of operator fusion management operations. In embodiments, determining the set of operator fusion management operations based on the topology model may include using a deployment cluster load factor related to a separate stream application.

In embodiments, determining the set of operator fusion management operations based on the topology model may include identifying a set of inflexible parameters with respect to the set of operator fusion management operations and identifying a set of flexible parameters with respect to the set of operator fusion management operations. A set of inflexible parameter values for the set of inflexible parameters may be configured to disallow a first modification which exceeds a first threshold, and a set of flexible parameter values for the set of flexible parameters may be configured to allow a second modification within a second threshold. In embodiments, a familial subset of the set of stream operators may be detected using the topology model. The familial subset of the set of stream operators may indicate one or more stream operators that have a fusion-related mandate. In embodiments, a single processing element that includes the familial subset of the set of stream operators may be built.

In embodiments, determining the set of operator fusion management operations based on the topology model may include formulating an order of operations for the set of operator fusion management operations. In embodiments, formulating the order of operations for the set of operator fusion management operations may include identifying, based on a processing element selection factor in response to identifying a first processing element to target for allocation with a first subset of the set of stream operators, a second processing element to target for allocation with a second subset of the set of stream operators. In embodiments, determining the set of operator fusion management operations based on the topology model may include identifying, based on a stream operator selection factor, a subset of the set of stream operators to allocate to a target processing element.

In embodiments, determining the set of operator fusion management operations based on the topology model may include computing a first expected performance factor for a first fusion cycle, computing a second expected performance factor for a second fusion cycle, comparing the first and second expected performance factors, and identifying, based on the first expected performance factor exceeding the second expected performance factor, the first fusion cycle. In embodiments, determining the set of operator fusion management operations based on the topology model may include calculating a number of processing elements to target using a feature which is selected from the group consisting of a user input, a processor proportion value, or a source-sink count. In embodiments, determining the set of operator fusion management operations based on the topology model may include resolving, with respect to an operator fusion action, a target processing element using an element which is selected from the group consisting of a stream operator balancing criterion to balance a number of stream operators per processing element, a source-sink count to fuse stream operators which are nearer to stream limits, and a new processing element.

In embodiments, determining the set of operator fusion management operations based on the topology model may include ascertaining, with respect to a target processing element, a target stream operator using a component which is selected from the group consisting of a set of chain criteria which indicates to continue a chain of a subset of the set of stream operators, a set of fusion criteria which indicates a set of target processing element parameters for a candidate stream operator, a number of interconnections between the target processing element and the target stream operator, and achievement of a match-absence threshold which indicates a deficiency of the target stream operator. Altogether, aspects of the disclosure can have performance or efficiency benefits (e.g., wear-rate, service-length, reliability, speed, flexibility, load balancing, responsiveness, stability, high availability, resource usage, productivity). Aspects may save resources such as bandwidth, disk, processing, or memory.

FIG. 1 illustrates one exemplary computing infrastructure 100 that may be configured to execute a stream computing application, according to some embodiments. The computing infrastructure 100 includes a management system 105 and two or more compute nodes 110A —110D—i.e., hosts—which are communicatively coupled to each other using one or more communications networks 120. The communications network 120 may include one or more servers, networks, or databases, and may use a particular communication protocol to transfer data between the compute nodes 110A-110D. A compiler system 102 may be communicatively coupled with the management system 105 and the compute nodes 110 either directly or via the communications network 120.

The communications network 120 may include a variety of types of physical communication channels or "links." The links may be wired, wireless, optical, or any other suitable media. In addition, the communications network 120 may include a variety of network hardware and software for performing routing, switching, and other functions, such as routers, switches, or bridges. The communications network 120 may be dedicated for use by a stream computing application or shared with other applications and users. The communications network 120 may be any size. For example, the communications network 120 may include a single local area network or a wide area network spanning a large geographical area, such as the Internet. The links may provide different levels of bandwidth or capacity to transfer data at a particular rate. The bandwidth that a particular link provides may vary depending on a variety of factors, including the type of communication media and whether particular network hardware or software is functioning correctly or at full capacity. In addition, the bandwidth that a particular link provides to a stream computing application may vary if the link is shared with other applications and users. The available bandwidth may vary depending on the load placed on the link by the other applications and users. The bandwidth that a particular link provides may also vary depending on a temporal factor, such as time of day, day of week, day of month, or season.

Figure 2:
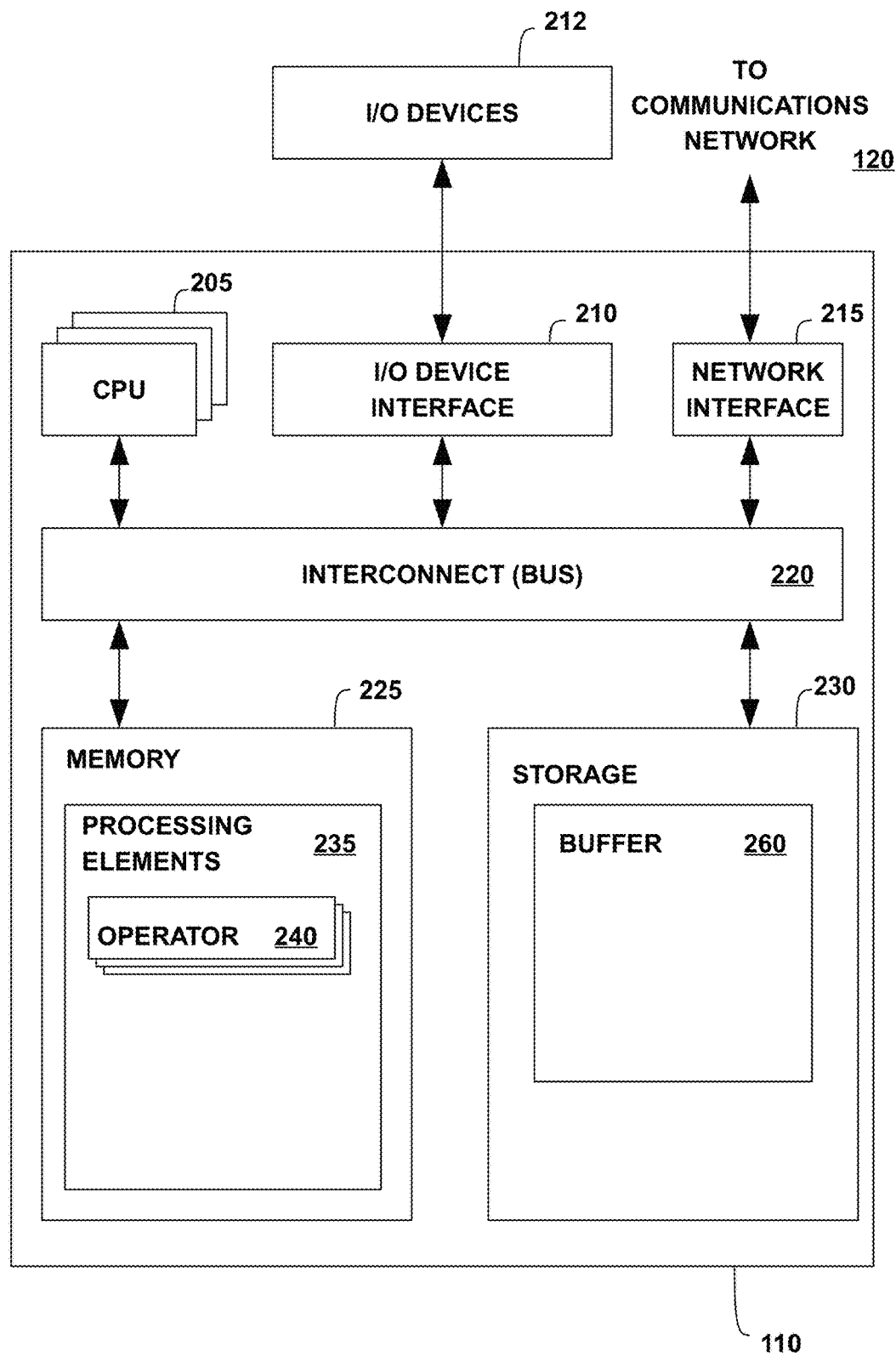
FIG. 2 illustrates a view of a compute node according to embodiments.

FIG. 2 is a more detailed view of a compute node 110, which may be the same as one of the compute nodes 110A-110D of FIG. 1, according to various embodiments. The compute node 110 may include, without limitation, one or more processors (CPUs) 205, a network interface 215, an interconnect 220, a memory 225, and a storage 230. The compute node 110 may also include an I/O device interface 210 used to connect I/O devices 212, e.g., keyboard, display, and mouse devices, to the compute node 110.

Each CPU 205 retrieves and executes programming instructions stored in the memory 225 or storage 230. Similarly, the CPU 205 stores and retrieves application data residing in the memory 225. The interconnect 220 is used to transmit programming instructions and application data between each CPU 205, I/O device interface 210, storage 230, network interface 215, and memory 225. The interconnect 220 may be one or more busses. The CPUs 205 may be a single CPU, multiple CPUs, or a single CPU having multiple processing cores in various embodiments. In one embodiment, a processor 205 may be a digital signal processor (DSP). One or more processing elements 235 (described below) may be stored in the memory 225. A processing element 235 may include one or more stream operators 240 (described below). In one embodiment, a processing element 235 is assigned to be executed by only one CPU 205, although in other embodiments the stream operators 240 of a processing element 235 may include one or more threads that are executed on two or more CPUs 205. The memory 225 is generally included to be representative of a random access memory, e.g., Static Random Access Memory (SRAM), Dynamic Random Access Memory (DRAM), or Flash. The storage 230 is generally included to be representative of a non-volatile memory, such as a hard disk drive, solid state device (SSD), or removable memory cards, optical storage, flash memory devices, network attached storage (NAS), or connections to storage area network (SAN) devices, or other devices that may store non-volatile data. The network interface 215 is configured to transmit data via the communications network 120.

A stream computing application may include one or more stream operators 240 that may be compiled into a "processing element" container 235. The memory 225 may include two or more processing elements 235, each processing element having one or more stream operators 240. Each stream operator 240 may include a portion of code that processes tuples flowing into a processing element and outputs tuples to other stream operators 240 in the same processing element, in other processing elements, or in both the same and other processing elements in a stream computing application. Processing elements 235 may pass tuples to other processing elements that are on the same compute node 110 or on other compute nodes that are accessible via communications network 120. For example, a processing element 235 on compute node 110A may output tuples to a processing element 235 on compute node 110B.

The storage 230 may include a buffer 260. Although shown as being in storage, the buffer 260 may be located in the memory 225 of the compute node 110 or in a combination of both memories. Moreover, storage 230 may include storage space that is external to the compute node 110, such as in a cloud.

The compute node 110 may include one or more operating systems 262. An operating system 262 may be stored partially in memory 225 and partially in storage 230. Alternatively, an operating system may be stored entirely in memory 225 or entirely in storage 230. The operating system provides an interface between various hardware resources, including the CPU 205, and processing elements and other components of the stream computing application. In addition, an operating system provides common services for application programs, such as providing a time function.

Figure 3:
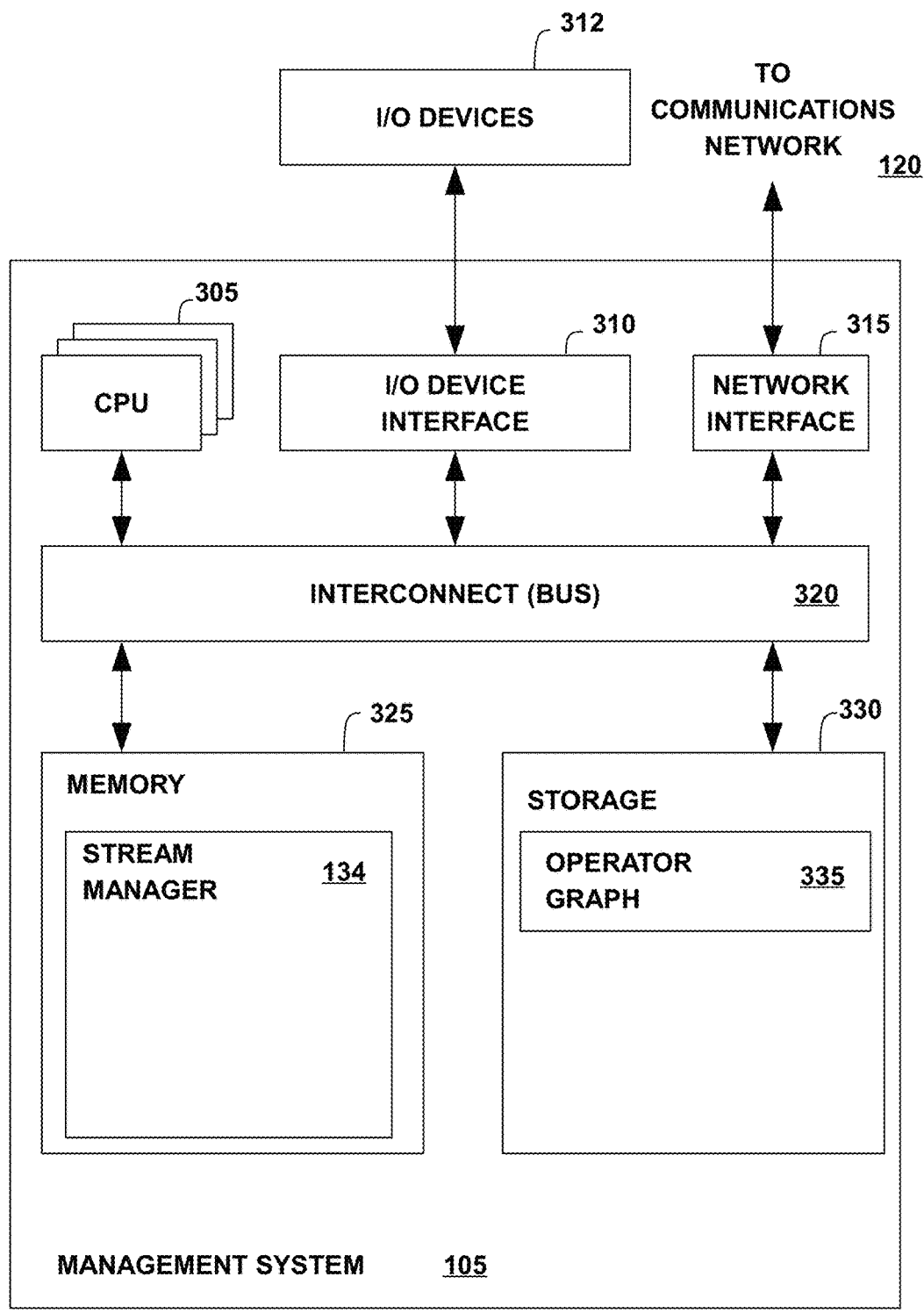
FIG. 3 illustrates a view of a management system according to embodiments.

FIG. 3 is a more detailed view of the management system 105 of FIG. 1 according to some embodiments. The management system 105 may include, without limitation, one or more processors (CPUs) 305, a network interface 315, an interconnect 320, a memory 325, and a storage 330. The management system 105 may also include an I/O device interface 310 connecting I/O devices 312, e.g., keyboard, display, and mouse devices, to the management system 105.

Each CPU 305 retrieves and executes programming instructions stored in the memory 325 or storage 330. Similarly, each CPU 305 stores and retrieves application data residing in the memory 325 or storage 330. The interconnect 320 is used to move data, such as programming instructions and application data, between the CPU 305, I/O device interface 310, storage unit 330, network interface 315, and memory 325. The interconnect 320 may be one or more busses. The CPUs 305 may be a single CPU, multiple CPUs, or a single CPU having multiple processing cores in various embodiments. In one embodiment, a processor 305 may be a DSP. Memory 325 is generally included to be representative of a random access memory, e.g., SRAM, DRAM, or Flash. The storage 330 is generally included to be representative of a non-volatile memory, such as a hard disk drive, solid state device (SSD), removable memory cards, optical storage, Flash memory devices, network attached storage (NAS), connections to storage area-network (SAN) devices, or the cloud. The network interface 315 is configured to transmit data via the communications network 120.

The memory 325 may store a stream manager 134. Additionally, the storage 330 may store an operator graph 335. The operator graph 335 may define how tuples are routed to processing elements 235 (FIG. 2) for processing or stored in memory 325 (e.g., completely in embodiments, partially in embodiments).

The management system 105 may include one or more operating systems 332. An operating system 332 may be stored partially in memory 325 and partially in storage 330. Alternatively, an operating system may be stored entirely in memory 325 or entirely in storage 330. The operating system provides an interface between various hardware resources, including the CPU 305, and processing elements and other components of the stream computing application. In addition, an operating system provides common services for application programs, such as providing a time function.

Figure 4:
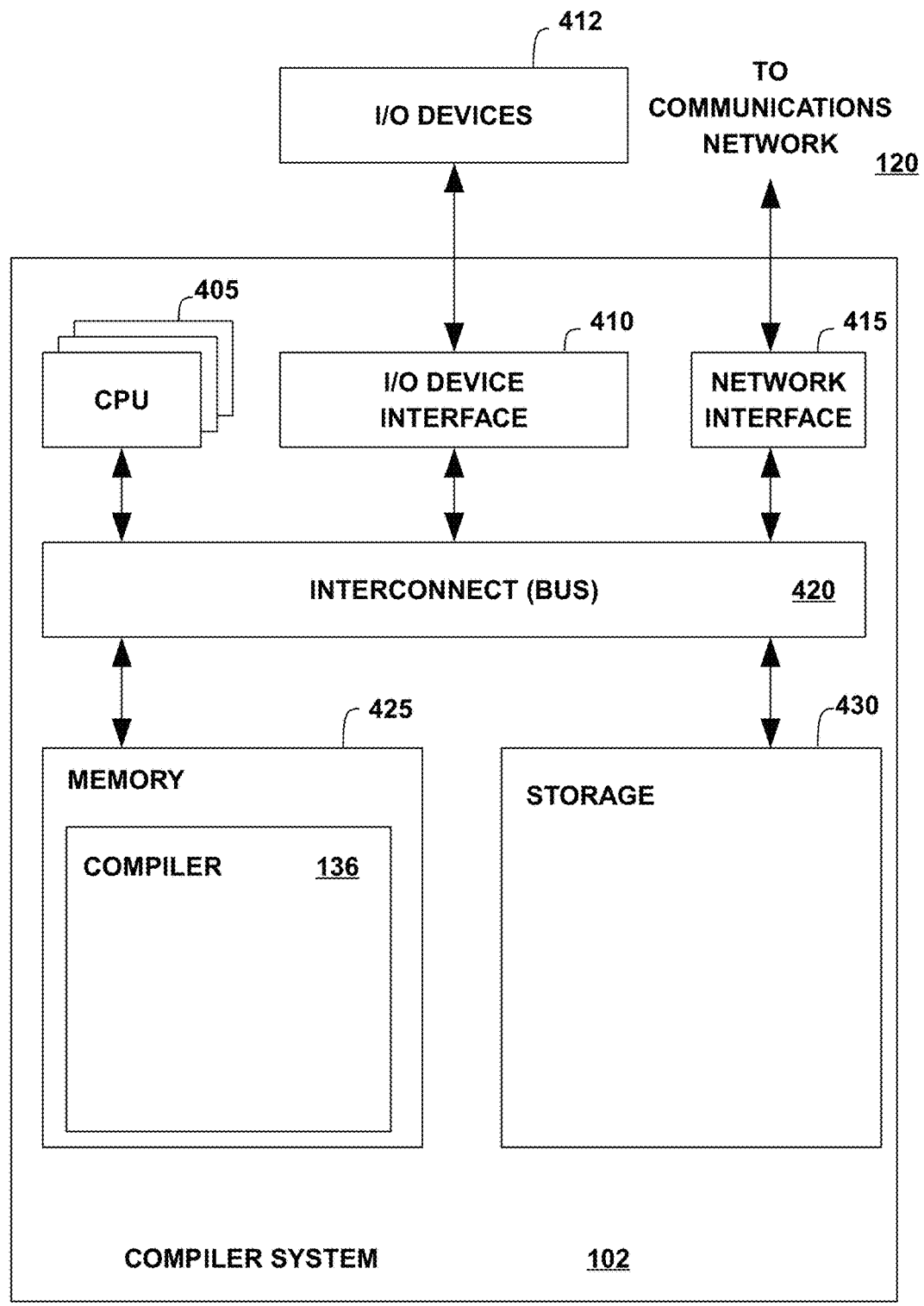
FIG. 4 illustrates a view of a compiler system according to embodiments.

FIG. 4 is a more detailed view of the compiler system 102 of FIG. 1 according to some embodiments. The compiler system 102 may include, without limitation, one or more processors (CPUs) 405, a network interface 415, an interconnect 420, a memory 425, and storage 430. The compiler system 102 may also include an I/O device interface 410 connecting I/O devices 412, e.g., keyboard, display, and mouse devices, to the compiler system 102.

Each CPU 405 retrieves and executes programming instructions stored in the memory 425 or storage 430. Similarly, each CPU 405 stores and retrieves application data residing in the memory 425 or storage 430. The interconnect 420 is used to move data, such as programming instructions and application data, between the CPU 405, I/O device interface 410, storage unit 430, network interface 415, and memory 425. The interconnect 420 may be one or more busses. The CPUs 405 may be a single CPU, multiple CPUs, or a single CPU having multiple processing cores in various embodiments. In one embodiment, a processor 405 may be a DSP. Memory 425 is generally included to be representative of a random access memory, e.g., SRAM, DRAM, or Flash. The storage 430 is generally included to be representative of a non-volatile memory, such as a hard disk drive, solid state device (SSD), removable memory cards, optical storage, flash memory devices, network attached storage (NAS), connections to storage area-network (SAN) devices, or to the cloud. The network interface 415 is configured to transmit data via the communications network 120.

The compiler system 102 may include one or more operating systems 432. An operating system 432 may be stored partially in memory 425 and partially in storage 430. Alternatively, an operating system may be stored entirely in memory 425 or entirely in storage 430. The operating system provides an interface between various hardware resources, including the CPU 405, and processing elements and other components of the stream computing application. In addition, an operating system provides common services for application programs, such as providing a time function.

The memory 425 may store a compiler 136. The compiler 136 compiles modules, which include source code or statements, into the object code, which includes machine instructions that execute on a processor. In one embodiment, the compiler 136 may translate the modules into an intermediate form before translating the intermediate form into object code. The compiler 136 may output a set of deployable artifacts that may include a set of processing elements and an application description language file (ADL file), which is a configuration file that describes the stream computing application. In some embodiments, the compiler 136 may be a just-in-time compiler that executes as part of an interpreter. In other embodiments, the compiler 136 may be an optimizing compiler. In various embodiments, the compiler 136 may perform peephole optimizations, local optimizations, loop optimizations, inter-procedural or whole-program optimizations, machine code optimizations, or any other optimizations that reduce the amount of time required to execute the object code, to reduce the amount of memory required to execute the object code, or both. The output of the compiler 136 may be represented by an operator graph, e.g., the operator graph 335.

The compiler 136 may also provide the application administrator with the ability to optimize performance through profile-driven fusion optimization. Fusing operators may improve performance by reducing the number of calls to a transport. While fusing stream operators may provide faster communication between operators than is available using inter-process communication techniques, any decision to fuse operators requires balancing the benefits of distributing processing across multiple compute nodes with the benefit of faster inter-operator communications. The compiler 136 may automate the fusion process to determine how to best fuse the operators to be hosted by one or more processing elements, while respecting user-specified constraints. This may be a two-step process, including compiling the application in a profiling mode and running the application, then re-compiling and using the optimizer during this subsequent compilation. The end result may, however, be a compiler-supplied deployable application with an optimized application configuration.

Figure 5:
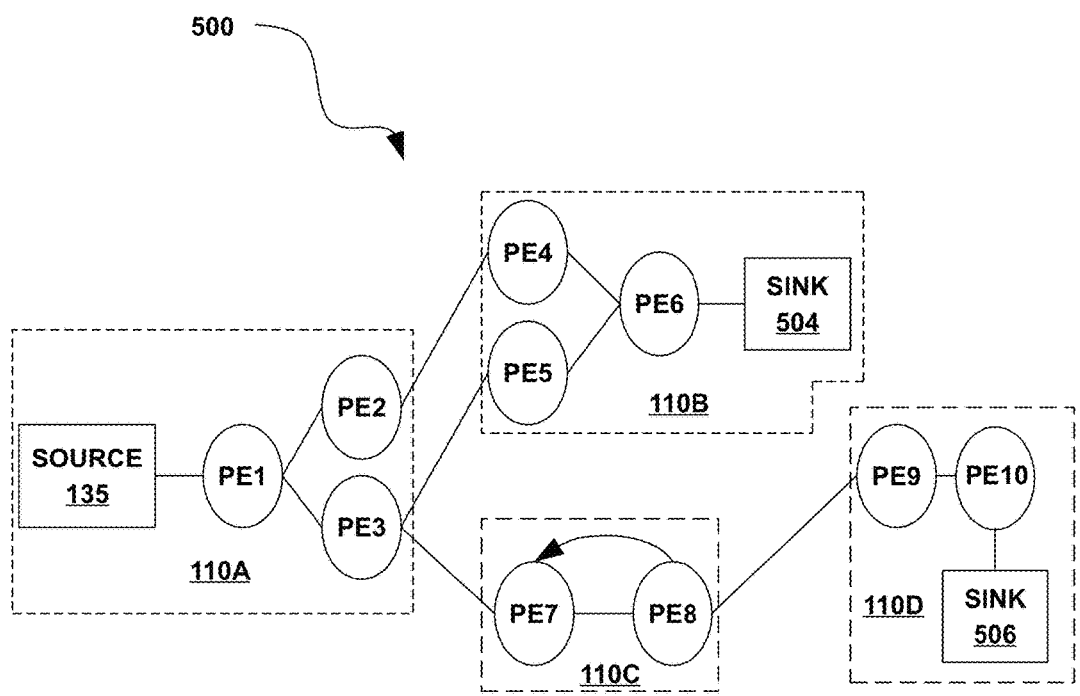
FIG. 5 illustrates an exemplary operator graph for a stream computing application according to embodiments.

FIG. 5 illustrates an exemplary operator graph 500 for a stream computing application beginning from one or more sources 135 through to one or more sinks 504, 506, according to some embodiments. This flow from source to sink may also be generally referred to herein as an execution path. In addition, a flow from one processing element to another may be referred to as an execution path in various contexts. Although FIG. 5 is abstracted to show connected processing elements PE1-PE10, the operator graph 500 may include data flows between stream operators 240 (FIG. 2) within the same or different processing elements. Typically, processing elements, such as processing element 235 (FIG. 2), receive tuples from the stream as well as output tuples into the stream (except for a sink—where the stream terminates, or a source—where the stream begins). While the operator graph 500 includes a relatively small number of components, an operator graph may be much more complex and may include many individual operator graphs that may be statically or dynamically linked together.

The example operator graph shown in FIG. 5 includes ten processing elements (labeled as PE1-PE10) running on the compute nodes 110A-110D. A processing element may include one or more stream operators fused together to form an independently running process with its own process ID (PID) and memory space. In cases where two (or more) processing elements are running independently, inter-process communication may occur using a "transport," e.g., a network socket, a TCP/IP socket, or shared memory. Inter-process communication paths used for inter-process communications can be a critical resource in a stream computing application. However, when stream operators are fused together, the fused stream operators can use more rapid communication techniques for passing tuples among stream operators in each processing element.

The operator graph 500 begins at a source 135 and ends at a sink 504, 506. Compute node 110A includes the processing elements PE1, PE2, and PE3. Source 135 flows into the processing element PE1, which in turn outputs tuples that are received by PE2 and PE3. For example, PE1 may split data attributes received in a tuple and pass some data attributes in a new tuple to PE2, while passing other data attributes in another new tuple to PE3. As a second example, PE1 may pass some received tuples to PE2 while passing other tuples to PE3. Tuples that flow to PE2 are processed by the stream operators contained in PE2, and the resulting tuples are then output to PE4 on compute node 110B. Likewise, the tuples output by PE4 flow to operator sink PE6 504. Similarly, tuples flowing from PE3 to PE5 also reach the operators in sink PE6 504. Thus, in addition to being a sink for this example operator graph, PE6 could be configured to perform a join operation, combining tuples received from PE4 and PE5. This example operator graph also shows tuples flowing from PE3 to PE7 on compute node 110C, which itself shows tuples flowing to PE8 and looping back to PE7. Tuples output from PE8 flow to PE9 on compute node 110D, which in turn outputs tuples to be processed by operators in a sink processing element, for example PE10 506.

Processing elements 235 (FIG. 2) may be configured to receive or output tuples in various formats, e.g., the processing elements or stream operators could exchange data marked up as XML documents. Furthermore, each stream operator 240 within a processing element 235 may be configured to carry out any form of data processing functions on received tuples, including, for example, writing to database tables or performing other database operations such as data joins, splits, reads, etc., as well as performing other data analytic functions or operations.

The stream manager 134 of FIG. 1 may be configured to monitor a stream computing application running on compute nodes, e.g., compute nodes 110A-110D, as well as to change the deployment of an operator graph, e.g., operator graph 132. The stream manager 134 may move processing elements from one compute node 110 to another, for example, to manage the processing loads of the compute nodes 110A-110D in the computing infrastructure 100. Further, stream manager 134 may control the stream computing application by inserting, removing, fusing, un-fusing, or otherwise modifying the processing elements and stream operators (or what tuples flow to the processing elements) running on the compute nodes 110A-110D.

Because a processing element may be a collection of fused stream operators, it is equally correct to describe the operator graph as one or more execution paths between specific stream operators, which may include execution paths to different stream operators within the same processing element. FIG. 5 illustrates execution paths between processing elements for the sake of clarity.

Figure 6:
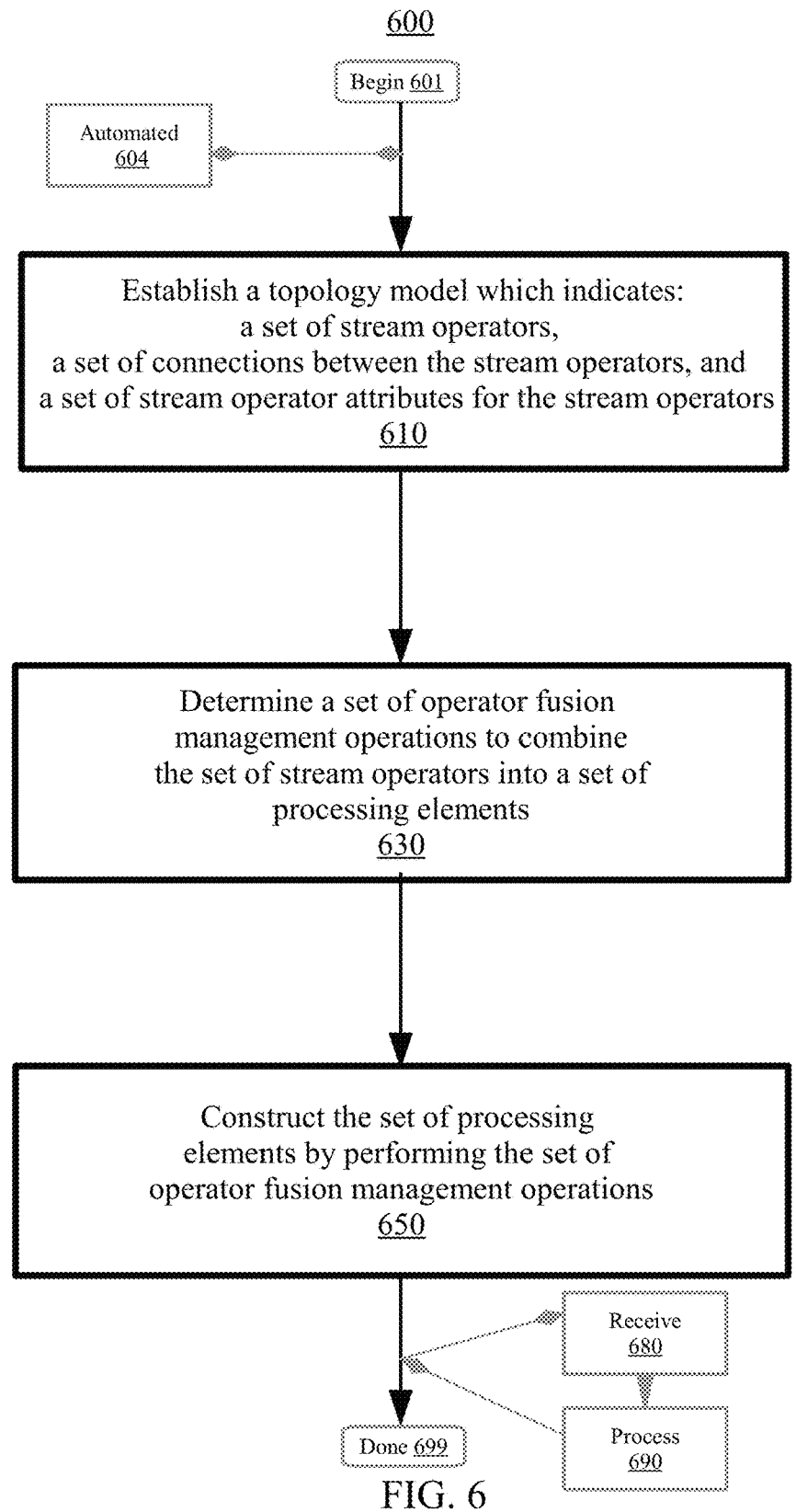
FIG. 6 is a flowchart illustrating a method for operator fusion management in a stream computing environment, according to embodiments.

FIG. 6 is a flowchart illustrating a method 600 for operator fusion management in a stream computing environment, according to embodiments. Aspects of method 600 relate to determining a set of operator fusion management operations to combine the set of stream operators into a set of processing elements based on a topology model. The topology model may indicate the set of stream operators, a set of connections between the set of stream operators, and a set of stream operator attributes for the set of stream operators. The operator fusion management operations may be determined based on a number of factors and heuristics (e.g., deployment cluster characteristics, user motivations, application characteristics, fusion cycle result evaluations, application load conditions). Leveraging operator fusion management techniques may be associated with benefits including data processing efficiency and stream application performance. The method 600 may begin at block 601.

In embodiments, the establishing, the determining, the constructing, and other steps described herein may each occur in an automated fashion without user intervention (e.g., using automated computing machinery, fully machine-driven without manual stimuli) at block 604. In embodiments, the establishing, the determining, the constructing, and other steps described herein may be carried out by an internal operator fusion management module maintained in a persistent storage device of a computing node that hosts the streaming application containing the set of stream operators. In certain embodiments, the establishing, the determining, the constructing, and other steps described herein may be carried out by an external operator fusion management module (e.g., composer, fusion management engine) hosted by a remote computing device or server (e.g., accessible via a subscription, usage-based, or other service model). In this way, aspects of operator fusion management in a stream computing environment may be performed using automated computing machinery without manual action. Other methods of performing the steps described herein are also possible.

At block 610, a topology model may be established. The topology model may indicate a set of stream operators, a set of connections between the set of stream operators, and a set of stream operator attributes for the set of stream operators. Generally, establishing can include organizing, arranging, instantiating, or otherwise setting up the topology model. The topology model may include a representation of the arrangement of the various elements (e.g., connections, nodes, operators, tuples) that make up a stream computing application. As an example, the topology model may include an operator graph. In embodiments, establishing the topology model may include arranging a set of stream operators or processing elements in the operating graph of a streaming application, and configuring the stream operators and processing elements for handling and processing of a set of tuples. The set of stream operators may include data processing units configured to perform operations (e.g., logic-based analysis, attribute modification) on data (e.g., tuples) as part of a stream computing application. The set of stream operators may operate on incoming tuples to produce output tuples. In embodiments, the topology model may indicate a set of connections between the set of stream operators. The set of connections may include links, couplings, bonds, or other indications of the relationship between one or more stream operators of the set of stream operators. For instance, the set of connections may indicate which stream operators are linked to which other stream operators of the topology model, whether a stream operator is located upstream or downstream with respect to another stream operator, frequency of data traffic between two stream operators, or the like. The topology model may also indicate a set of stream operator attributes for the set of stream operators. The set of stream operator attributes may include information regarding the characteristics, properties, or other aspects of the set of stream operators. For example, the set of stream operator attributes may indicate the type or function (e.g., join, ingest, sort, functor) of the stream operators, performance characteristics (e.g., tuple throughput rate) of the set of stream operators, fusion compatibility factors (e.g., low compatibility with a first operator type, high compatibility with a second operator type) and other properties of the set of stream operators. Other methods of establishing the topology model are also possible.

Consider the following example. An integrated development environment (IDE) for an in-development stream application may include an operating graph. A group of stream operators may be identified for placement in the operating graph of the streaming application (e.g., stream operators that facilitate performance of the stream application). The group of identified stream operators may be placed in the operating graph. The IDE for the stream application may include an information summary tool that displays the stream operators that have been placed in the operating graph. In embodiments, the IDE may indicate a connection tree that displays the stream operators that are connected to a particular stream operator, as well as information regarding communication between connected stream operators (e.g., tuple transmission rate, communication frequency, upstream/downstream location). In certain embodiments, each stream operator of the set of stream operators may be associated with a stream operator profile that includes a set of stream operator attributes (e.g., performance characteristics, fusion compatibility/constraints) describing the operation and function that stream operator performs in the stream application. Other methods of establishing the topology model are also possible.

At block 630, a set of operator fusion management operations to combine the set of stream operators into a set of processing elements may be determined. Generally, determining can include formulating, identifying, computing, calculating, resolving, selecting, or ascertaining the set of operator fusion management operations. In embodiments, determining the set of operator fusion management operations may include selecting a subset of the set of stream operators for fusion, as well as identifying a particular operator fusion management operation for the subset of stream operators. The set of operator fusion management operations may include one or more routines, sub-routines, processes, or procedures for combining a plurality of stream operators into a processing element. In embodiments, the operator fusion management operations may be based on the topology model. For instance, the topology model may indicate one or more fusion factors (e.g., via the set of stream operators, set of connections, or set of stream operator attributes) such as deployment cluster characteristics (e.g., size and number of hosts), user motivations (e.g., target number of processing elements), application characteristics (e.g., developer expressed constraints), fusion cycle result evaluations (e.g., prediction of operator fusion outcomes), application load conditions (e.g., host resources available for processing elements) or other factors that affect operator fusion. In embodiments, determining the set of operator fusion management operations may include performing a series of fusion cycles. The fusion cycles may include simulated fusion operations performed with different fusion parameters (e.g., different stream operators, fusion constraints, fusion rule sets). In embodiments, the results of a number of fusion cycles may be compared, and a set of operator fusion management operations associated with positive impacts (e.g., stream application performance, desirable processing element configuration) with respect to the stream computing environment may be determined. Other methods of determining the set of operator fusion management operations are possible.

Consider the following example. A topology model may include 8 stream operators selected as targets for operator fusion management operations. Each stream operator may be associated with different performance characteristics (e.g., tuple throughput rate), fusion constraints (e.g., other operators it may not be fused with, must be fused with), and other attributes that affect the fusion process. As described herein, a series of fusion cycles may be performed to determine the set of operator fusion management operations. In embodiments, it may be detected (e.g., based on a user input) that the 8 stream operators should be fused into 3 processing elements. Additionally, it may be identified that 3 of the 8 stream operators are part of a subset of stream operators that must be fused together (e.g., they are part of the same fusable unit/familial subset). Accordingly, a series of fusion cycles may be generated, where each fusion cycle is configured to simulate a different operator fusion scenario (e.g., fuse operators so that all resultant processing elements have roughly the same tuple throughput rate, fuse all operators that share a particular attribute together, put all connected operators on the same processing element). In response to performing the series of fusion cycles, the results of each simulated fusion cycle may be evaluated, and the set of operator fusion management operations (e.g., associated with positive impacts for the stream computing environment) may be determined. For instance, a set of operator fusion management options that place the subset of 3 stream operators and one additional stream operator on a first processing element, and the other 4 processing elements split evenly between two more processing elements may be detected to achieve the fusions constraints for the set of stream operators. Other methods of determining the set of operator fusion management operations are also possible.

At block 650, the set of processing elements may be constructed by performing the set of operator fusion management operations. Generally, constructing can include structuring, building, formulating, producing, composing, or otherwise creating the set of processing elements. In embodiments, constructing the set of processing elements may include selecting one or more stream operators of the set of stream operators to combine together into a set of processing elements. As described herein, the set of processing elements may be constructed by performing the set of operator fusion management operations. For instance, constructing may include combining the set of processing elements in accordance with the results of the fusion composition cycles. In certain embodiments, constructing the set of processing elements may include dynamically (e.g., in real-time, on-the-fly) altering the job submission process for the stream application to account for the instantaneous runtime specifics of the deployment configuration, the stream application's operational characteristics, and parameters specified by the job submitter. As an example, constructing the set of processing elements may include fusing a string of operators beginning with a source operator and ending with a sink operator (e.g., group of connected operators) into a single processing element. Other methods of constructing the set of processing elements are also possible.

Consider the following example. A topology model may include 5 stream operators A, B, C, D, E selected as targets for operator fusion management operations. The topology model may be associated with a set of fusion constraints that affect which operators may or may not be fused together (e.g., placed on the same processing operator). The set of fusion constraints may include hard constraints (e.g., inflexible parameters that must be achieved by the operator fusion management operations) and soft constraints (e.g., flexible parameters that should be prioritized to the degree that they do not interfere with hard constraints). For instance, the set of fusion constraints may include a hard constraint that stream operators C and E must be fused together, a hard constraint that A and C cannot be fused together, a soft constraint to fuse stream operators A and E together, and an additional soft constraint to place connected operators together on the same processing element. In embodiments, stream operators C and D may be connected. In embodiments, the topology model may include a specification (e.g., user specified parameter) that the set of operator fusion management operations should create 2 resultant processing elements. Accordingly, as described herein, the fusion constraints of the topology model may be analyzed to determine a set of operator fusion management operations to combine the set of stream operators into a set of processing elements. As an example, a set of operator fusion management operations may be determined that places stream operators C, D, and E together on the first processing element, and A and B together on the second processing element. As such, both hard constraints are achieved, as well as the soft constraint to place connected operators on the same processing element (e.g., the soft constraint to place operators A and E together may interfere with the hard constraint to put operators E and C together as well as the hard constraint that operators A and C may not be placed together, and thus may be disregarded). The stream operators may be placed as indicated by the set of operator fusion management operations, and fused to construct the first and second processing elements. Other methods of constructing the set of processing elements are also possible.

In certain embodiments, a stream of tuples is received at block 680. The stream of tuples may be processed by a plurality of processing elements (e.g., stream operators) operating on a set of compute nodes (e.g., in a stream application environment). The stream of tuples may be received consistent with the description herein including FIGS. 1-12. Current/future processing by the plurality of processing elements may be performed consistent with the description herein including FIGS. 1-12. The set of compute nodes may include a shared pool of configurable computing resources. For example, the set of compute nodes can be a public cloud environment, a private cloud environment, or a hybrid cloud environment. In certain embodiments, each of the set of compute nodes are physically separate from one another.

In certain embodiments, the stream of tuples is processed at block 690. The stream of tuples may be processed by the plurality of processing elements operating on the set of compute nodes. The stream of tuples may be processed consistent with the description herein including FIGS. 1-12. In embodiments, stream operators operating on the set of compute nodes may be utilized to process the stream of tuples. Processing of the stream of tuples by the plurality of processing elements may provide various flexibilities for stream operator management. Overall flow (e.g., data flow) may be positively impacted by utilizing the stream operators.

Method 600 concludes at block 699. Aspects of method 600 may provide performance or efficiency benefits for operator fusion management in a stream computing environment. For example, aspects of method 600 may have positive impacts with respect to determining and constructing a set of processing elements using a set of operator fusion management operations (e.g., reliability, speed, flexibility, resource usage, productivity). Altogether, leveraging operator fusion host management techniques may be associated with benefits including data processing efficiency and stream application performance.

Figure 7:
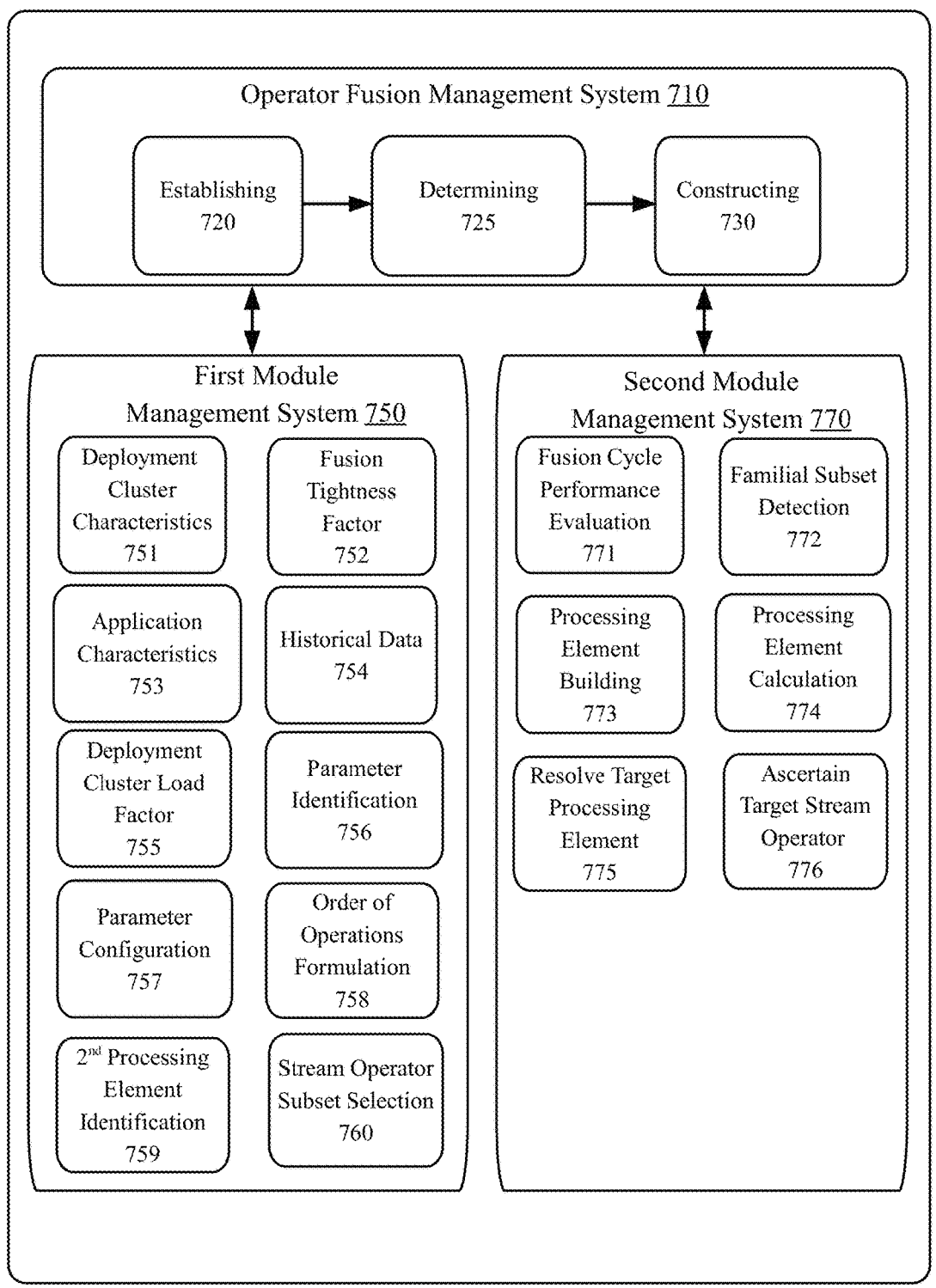
FIG. 7 shows an example system for operator fusion management in a stream computing environment, according to embodiments.

FIG. 7 shows an example system 700 for operator fusion management in a stream computing environment, according to embodiments. Aspects of FIG. 7 are directed toward determining the set of operator fusion management operations based on a variety of factors that influence operator fusion (e.g., deployment cluster characteristics, user motivations, application characteristics, fusion cycle result evaluations, application load conditions). The example system 700 may include an operator fusion management system 710. The operator fusion management system 710 may include an establishing module 720 configured to establish a topology model, a determining module 725 configured to determine a set of operator fusion management operations based on the topology model, and a constructing module 730 configured to construct a set of processing elements by performing the set of operator fusion management operations. The operator fusion management system 710 may be communicatively connected with a first module management system 750 and a second module management system 770 that each include one or more modules for performing other operations related to operator fusion management.

In embodiments, determining the set of operator fusion management operations may include using a set of deployment cluster characteristics at module 751. The set of deployment cluster characteristics may include both a compute host quantity factor and a compute host size factor. Generally, the set of deployment cluster characteristics may include information regarding the attributes and properties of the host compute nodes to which the set of processing elements may be deployed. For instance, the set of deployment cluster characteristics may include a compute host quantity factor that indicates the number of host compute nodes available to receive deployment of the set of processing elements, and a compute host size factor that indicates the number of processing elements that may be maintained by each available host compute node. As another example, the set of deployment cluster characteristics may include data regarding the computing resources available for use by hosted processing elements, the type/function of past/currently hosted processing elements, and other information. Aspects of the description relate to the recognition that, in embodiments, the set of deployment cluster characteristics may be used to determine the set of operator fusion management operations. For instance, based on the number of available host compute nodes (e.g., as indicated by the set of deployment cluster characteristics), it may be desirable to increase or decrease the number of processing elements created from fusion. Other methods of using the set of deployment cluster characteristics are also possible.

In embodiments, determining the set of operator fusion management operations may include using a fusion tightness factor at module 752. Generally, the fusion tightness factor may be a representation of the number of stream operators that are placed on a given processing element. Processing elements that contain a relatively high number of stream operators may be considered to be "tightly" fused, while processing elements that contain a relatively low number of stream operators may be considered to be "lightly" fused. In embodiments, the fusion tightness factor may be expressed as a ratio of the storage space occupied by stream operators with respect to the total storage space available for stream operators on a processing element (e.g., 4.1 gigabytes of 5 total gigabytes), or as the number of stream operators on a processing element with respect to the maximum number of stream operators that may be placed on that processing element (e.g., 7 stream operators out of 10 total placement slots). In embodiments, the fusion tightness factor may be associated with a target number of processing elements to be created by the set of operator fusion management operations. As an example, a request (e.g., received from a user) to "fuse tightly" may prioritize creation of a fewer number of processing elements with a greater number of stream operators per processing element, while a request to "fuse lightly" may prioritize creation of a greater number of processing elements with a fewer number of stream operators per processing element. In certain embodiments, a user may specify a target number of processing elements (e.g., 5), and a desired fusion tightness factor, and the set of operator fusion management operations may be determined such that the resultant processing elements achieve the specified criteria. Other methods of using the fusion tightness factor are also possible.

In embodiments, determining the set of operator fusion management operations may include using a set of application characteristics at module 753. The set of application characteristics may include a stream operator co-location criterion, a stream operator ex-location criterion, a stream operator isolation criterion, a stream operator count, and a constraint complexity factor. Generally, the set of application characteristics may include criteria or constraints that govern which stream operators may or may not be placed together (e.g., on the same processing element). In embodiments, the stream operator co-location criterion may indicate one or more stream operators that must be fused together on the same processing element. In embodiments, the stream operator ex-location criterion may indicate one or more stream operators that must not be fused together on the same processing element. In embodiments, the stream operator isolation criterion may indicate one or more stream operators that may not be placed together with any other stream operators on the same processing element (e.g., must be placed alone on a processing element). In embodiments, the constraint complexity factor may be an indication of the degree of complexity of the constraints specified with respect to operator fusion (e.g., large number of constraints, difficult to resolve). Other types of application characteristics are also possible.

In embodiments, determining the set of operator fusion management operations may include using a set of historical data associated with a set of parameters of the set of operator fusion management operations at module 754. Generally, the set of historical data can include the results of one or more stream operator fusion simulations (e.g., simulated/predicted outcomes of different operator fusion arrangements using different heuristics/rules/constraints). As described herein, aspects of the disclosure relate to performing a series of stream operator fusion cycles such that each cycle applies/prioritizes different fusion constraints, and the results of each fusion cycle may be collected and maintained as a set of historical data. The collected historical data for the series of stream operator fusion cycles may be evaluated and used to determine the set of operator fusion management operations for the set of stream operators. In certain embodiments, aspects of the disclosure relate to the recognition that the constraints governing operator fusion may be too restrictive, such that a suitable set of operator fusion management operations cannot be resolved (e.g., as indicated by the set of historical data). Accordingly, in response to failing to resolve/determine the set of operator fusion management operations, the constraints may be relaxed (e.g., loosened, slackened) to facilitate determination of the set of operator fusion management operations. For instance, the set of historical data may be analyzed to determine a past constraint configuration that allowed for resolution of the operator fusion management operations. Other methods of using the set of historical data are also possible.

In embodiments, determining the set of operator fusion management operations may include using a deployment cluster load factor related to a separate stream application at module 755. Generally, the deployment cluster load factor can include a representation of the workload configuration of a streaming application. For instance, the deployment cluster load factor may indicate the amount of computing resources (e.g., processing resources, memory resources, storage resources, network bandwidth) in use by a streaming application, the relative utilization level of the streaming application (e.g., by a user, virtual machine, other application), or other representation of the amount of tasks/operations/work managed by the streaming application. Aspects of the disclosure relate to the recognition that, in certain embodiments, one or more potential host compute nodes may host a streaming application associated with a heavy workload, limiting the resources available for hosting additional processing elements. Accordingly, the number of processing elements to be constructed by the set of operator fusion management operations may be based on the deployment cluster load factor. As an example, in a situation in which a number of potential host compute nodes are overloaded (e.g., associated with heavy workloads as indicated by the deployment cluster load factor), it may be desirable to fuse a lesser number of processing elements that may be more easily placed on less loaded host compute nodes. Other methods of using the deployment cluster load factor are also possible.

In embodiments, determining the set of operator fusion management operations may include identifying a set of parameters at module 756. Generally, identifying can include detecting, discovering, recognizing, receiving, or otherwise ascertaining the set of parameters. The set of parameters may include a set of inflexible parameters with respect to the set of operator fusion management operations and a set of flexible parameters with respect to the set of operator fusion management operations. The set of inflexible parameters may include hard constraints or required criteria regarding stream operator fusion that must be achieved by the set of operator fusion management operations in order to qualify as a valid fusion configuration for the set of processing elements. As an example, the set of inflexible parameters may include a criterion that specifies two operators to be fused together, or a requirement that indicates that all processing elements include at least 3 stream operators. The set of flexible parameters may include soft constraints or recommended criteria regarding stream operator fusion. The set of flexible parameters may be associated with a range of target values, or a weighting value that indicates the relative degree of importance of the parameter (e.g., parameters with high weighting values may be prioritized over parameters with low weighting values). As an example, the set of flexible parameters may include a criterion that specifies two operators that may not be desirable to be fused together, or a range of target tuple throughput rates (e.g., between 500 and 800 tuples per second) for the resultant processing elements. In embodiments, the set of parameters may be detected by an operator fusion management module based on the system properties of potential host compute nodes and the performance characteristics of the streaming application. In embodiments, the set of parameters may be received by a user or administrator of the stream computing environment. Other methods of identifying the set of parameters are also possible.

In embodiments, the set of parameters may be configured at module 757. Generally, configuring may include establishing, modifying, altering, instantiating, setting, or revising the set of parameters. In embodiments, configuring the set of parameters may include configuring a set of inflexible parameter values for the set of inflexible parameters to disallow a first modification which exceeds a first threshold. The set of inflexible parameter values may include one or more numbers, figures, or symbols that define a setting or property of a particular inflexible parameter. In embodiments, the set of inflexible parameter values may define a fixed attribute or limit (e.g., fixed resource usage level, tuple throughput rate) of a parameter, such that attempted modifications that exceed a first threshold are denied (e.g., refused, prevented, forbidden). In embodiments, configuring the set of parameters may include configuring a set of flexible parameter values (e.g., numbers, figures, or symbols that define a setting or property of a particular flexible parameter). The set of flexible parameter values may define a malleable or adjustable attribute of a parameter, such that modifications within a second threshold are allowed. Consider an example situation in which a set of inflexible parameter values specify that the minimum acceptable tuple throughput rate (e.g., first threshold) for a first processing element is 700 tuples per second. The addition or removal of a stream operator that would decrease the tuple throughput rate of the processing element below 700 tuples may be prevented. As another example, a set of flexible parameter values may designate a target tuple throughput rate (e.g., second threshold) for a second processing element is between 400 and 800 tuples per second. Accordingly, the addition or removal of stream operators to the second processing element may be permitted provided the tuple throughput rate remains between 400 and 800 tuples per second. Other methods of configuring the set of parameters are also possible.

In embodiments, determining the set of operator fusion management operations may include formulating an order of operations for the set of operator fusion management operations at module 758. Generally, formulating can include ordering, sequencing, ascertaining, or determining the order of operations for the set of fusion management operations. The order of operations for the set of fusion management operations may include an arrangement of the type and sequence of analysis processes to be performed on the topology model (e.g., to determine how to fuse the set of stream operators). As described herein, formulating the order of operations may include generating a series of fusion cycles for the set of stream operators. For instance, a fusion cycle in which a first set of fusion constraints (e.g., desired fusion tightness factor of 4 operators per processing element, inflexible ex-location criterion for a subset of operators) are applied to the set of stream operators may be scheduled as a first cycle, and a fusion cycle in which a second set of fusion constraints (e.g., target processing element number of 6, flexible co-location criterion for a subset of operators, threshold throughput rate of at least 400 tuples per second) are applied to the set of stream operators may be scheduled as a second cycle of the series of fusion cycles. As described herein, the series of fusion cycles may be performed based on the formulated order of operations, and result data (e.g., historical data) from each cycle may be gathered and used to facilitate determination of the set of operator fusion management operations. Other methods of formulating the order of operations for the set of fusion management operations are also possible.

In embodiments, a second processing element to target for allocation with a second subset of the set of stream operators may be identified at module 759. The second processing element may be identified based on a processing element selection factor in response to identifying a first processing element to target for allocation with a first subset of the set of stream operators. Generally, identifying can include detecting, selecting, recognizing, ascertaining, or determining the second processing element. Aspects of the disclosure relate to the recognition that the processing elements selected for receiving deployment of stream operators may be identified based on the properties of other processing elements of the stream computing environment. In embodiments, the processing element selection factor may include a set of guidelines, specifications, or other criteria that govern which processing elements may be included in the set of operator fusion management operations. For instance, the processing element selection factor may indicate that stream operators should be placed on the processing elements that have the fewest number of deployed stream operators (e.g., fill processing elements starting with the emptiest). As such, in response to placing a first stream operator on a first processing element, the set of processing elements may be analyzed to ascertain a second processing element that currently hosts the fewest (e.g., number below a threshold) number of stream operators, and the second processing element may be selected for allocation of a second stream operator. Other methods of identifying a processing element based on a processing element selection factor are also possible.

In embodiments, determining the set of operator fusion management operations may include identifying a subset of the set of stream operators to allocate to a target processing element based on a stream operator selection factor at module 760. Generally, identifying can include detecting, selecting, recognizing, ascertaining, or determining the subset of the set of stream operators to allocate to a target processing element. In embodiments, aspects of the disclosure relate to selecting the stream operators for placement on a processing element based on the stream operators already located on the processing element, characteristics of the processing element or stream operator (e.g., type, function, system resource usage requirements, performance properties) and other factors. In embodiments, the stream operator selection factor may include a set of guidelines, specifications, or other criteria that govern which stream operators may be selected for placement on one or more processing elements. For instance, the stream operator selection factor may indicate that stream operators that share a type (e.g., join) may be placed on a particular processing element, stream operators with a tuple throughput rate above a threshold value may be prioritized for placement on a processing element, or specify other requirements for stream operator selection. In certain embodiments, the stream operator selection factor may designate both a source operator and a sink operator of the topology model, and specify that the stream elements located between the source operator and sink operator be fused together on the same processing element. Other methods of identifying a subset of the set of stream operators based on a stream operator selection factor are also possible.

In embodiments, the set of operator fusion management operations may include one or more methods of consecutive operator placement (e.g., stream operator chaining). The consecutive operator placement methods may designate one or more strategies for successive fusion of the set of stream operators. In embodiments, the consecutive operator placement method may include a breadth-first operation. The breadth-first operation may specify simultaneous distribution of the stream operators on multiple processing elements (e.g., spreading out stream operators on separate processing elements). For instance, the breadth-first operation may be used to maintain a balance of the number of stream operators on each processing element. In embodiments, the consecutive operator placement method may include a depth-first operation. The depth-first operation may specify concentrated placement of stream operators on a single subset of processing elements until completion (e.g., storage space allocated for placement of stream operators is filled). Other methods of consecutive operator placement are also possible.

In embodiments, determining the set of operator fusion management operations may include a fusion cycle performance evaluation at module 771. As described herein, aspects of the disclosure relate to performing a series of fusion cycles (e.g., fusion composition cycles) to determine the set of operator fusion management operations. The series of fusion cycles may include simulated fusion operations performed with different fusion parameters (e.g., different stream operators, fusion constraints, fusion rule sets). In embodiments, a first expected performance factor for a first fusion cycle and a second expected performance factor for a second fusion cycle may be computed (e.g., calculated, formulated, derived, determined). The first and second expected performance factors may include comprehensive, quantitative representations of the efficiency, productivity, or overall effectiveness of the candidate operator fusion management operations simulated by the first and second fusion cycles. As an example, the first and second expected performance factors may be expressed as integers between 1 and 100, wherein greater integers (e.g., 85) represent greater performance and lower integers (e.g., 13) represent lesser performance. In embodiments, computing the first and second expected performance factors may include collecting trial results for the first and second fusion cycles, and evaluating the trial results with respect to a set of metrics (e.g., criteria, rubric). For instance, in certain embodiments, the first expected performance factor may be computed to be 73 and the second expected performance factor may be computed to be 38.

In embodiments, the first and second expected performance factors may be compared (e.g., contrasted, correlated, investigated). Comparing the first and second expected performance factors may include examining the first and second expected performance factors with respect to one another to ascertain a relationship between the magnitude of the first and second expected performance factors (e.g., first expected performance factor exceeds the second expected performance factor). Based on the comparison between the first and second expected performance factors, a fusion cycle corresponding to the greater expected performance factor may be selected. For instance, referring to the example described herein, in response to comparing the first and second expected performance factors and determining that the first expected performance factor of 73 exceeds the second expected performance factor of 38, the first fusion cycle may be identified. Accordingly, as described herein, a set of operator fusion management operations indicated by the first fusion cycle may be determined for construction of the set of processing elements.

In embodiments, a familial subset of the set of stream operators may be detected using the topology model at module 772. Generally, detecting can include sensing, discovering, recognizing, or otherwise ascertaining the familial subset of the set of stream operators. The familial subset may include one or more stream operators that are associated with a fusion-related mandate (e.g., directive, command, instruction). The fusion-related mandate may designate that the one or more stream operators must be fused together on the same processing element (e.g., co-located). In embodiments, one or more stream operators of the topology model may be marked with a tag or other identifier that indicates that they are part of a particular familial subset. In embodiments, a single processing element that includes the familial subset of the set of stream operators may be built at module 773. Building can include assembling, combining, fusing, or creating the single processing element. In embodiments, building may include allocating the familial subset to a particular processing element and fusing the familial subset with the processing element. As an example, a familial subset that includes 4 connected operators may be allocated and fused together to form a single processing element. Other methods of detecting the familial subset and building the single processing element including the familial subset are also possible.

In embodiments, determining the set of operator fusion management operations may include calculating a number of processing elements to target using a feature at module 774. The feature may include a user-input, a processor proportion value, or a source-sink count. Generally, calculating can include computing, formulating, ascertaining, or determining the number of processing elements to target using the feature. In embodiments, the user-input feature may include a user (e.g., stream computing environment administrator) designated number of processing elements (e.g., 10 processing elements). In embodiments, the processor proportion value may include a specified amount of processing resources allocated for use by the set of processing elements (e.g., 3 Gigahertz). In embodiments, the source-sink count may be a designated limit for the number of source and sink operators that may be located on a single processing element (e.g., maximum of 6 source and sink operators). In embodiments, calculating the number of processing elements to target using the feature may include monitoring the set of processing elements and detecting one or more triggering events (e.g., lack of resources, surplus storage space) that correspond to one or more features. Other types of features are also possible.

In embodiments, determining the set of operator fusion management operations may include resolving a target processing element using an element at module 775. The element may include a stream operator balancing criterion to balance a number of stream operators per processing element, a source-sink count to fuse stream operators which are nearer to stream limits, or a new processing element. Generally, resolving can include selecting, ascertaining, choosing, or determining the element with respect to an operator fusion action. In embodiments, the stream operator balancing criterion may include a placement requirement that specifies that stream operators should be placed on those processing elements that have the fewest stream operators (e.g., 9 stream operators placed one by one on 3 empty processing elements, resulting in 3 stream operators per processing element). The source-sink count to fuse stream operators may include a placement requirement that specifies that the stream operators located at the endpoints (e.g., source and sink operators) of the topology model be prioritized for placement on processing elements (e.g., start at the topology model endpoints and work toward the middle). In embodiments, the new processing element (e.g., brand new, rookie) may include an unused, empty processing element configured for receiving allocation of one or more stream operators (e.g., selected in response to a shortage of existing processing elements). Other types of elements for resolving the target processing element are also possible.

In embodiments, determining the set of operator fusion management operations may include ascertaining a target stream operator using a component at module 776. Generally, determining can include selecting, identifying, choosing, or determining the target stream operator. In embodiments, the component may include a set of chain criteria, a set of fusion criteria, a number of interconnections, or a match-absence threshold. The set of chain criteria may indicate to continue a chain of a subset of the set of stream operators. For instance, the set of chain criteria may specify to prioritize placement of one or more stream operators that are connected to or share properties/attributes with stream operators that are already placed on a particular processing element (e.g., in response to placing 3 of 4 connected operators on a first processing element, prioritize placement of the 4th connected operator to the same processing element). In embodiments, the set of fusion criteria may indicate a set of target processing element parameters for a candidate stream operator. As an example, the set of fusion criteria may include requirements (e.g., minimum/maximum resource requirements) of the processing element that must be achieved by a stream operator in order for the stream operator to be placed on the processing element. The number of interconnections may indicate the quantity of interconnections between the target processing element and the target stream operator. For instance, processing elements and stream operators that share a greater number of communication connections (e.g., network communication ports, input/output terminals) may be associated with a reduced need for inter-communication between separate processing elements (e.g., resulting in performance benefits). In embodiments, the match-absence threshold may indicate a deficiency of the target stream operator. As an example, a stream operator that does not match the fusion constraints specified by the set of operator fusion management operations may be considered to achieve the match-absence threshold (e.g., an operator with significant resource requirements that prevents placement on any available processing element). Other types of components for ascertaining the target stream operator are also possible.

Figure 8:
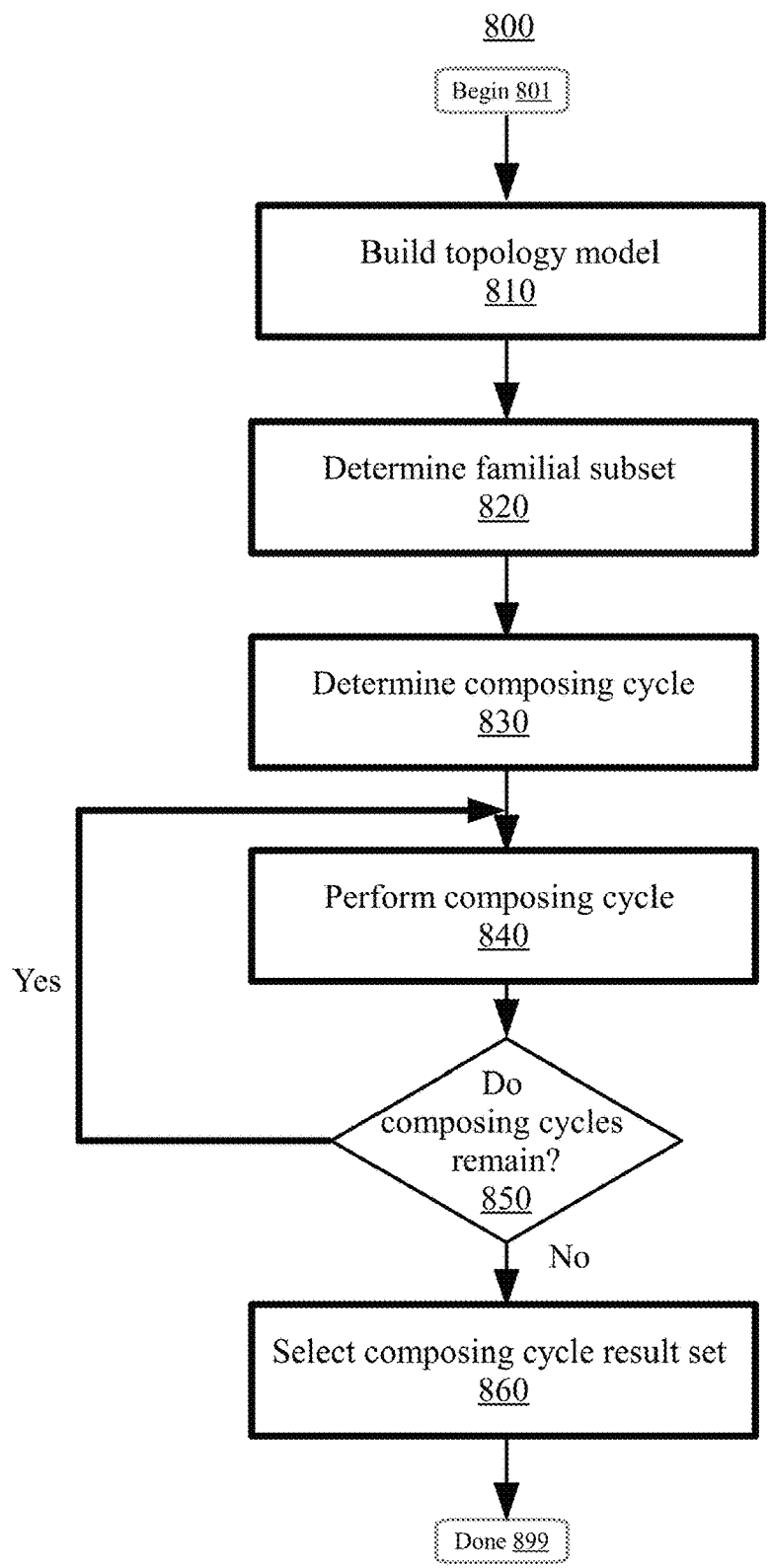
FIG. 8 is a flowchart illustrating a method for operator fusion management in a stream computing environment, according to embodiments.

FIG. 8 is a flowchart illustrating a method 800 for operator fusion management in a stream computing environment, according to embodiments. Aspects of method 800 relate to a composing flow for managing stream operator configuration and processing element fusion using a number of composing cycles (e.g., fusion cycles). Aspects of method 800 may substantially correspond with embodiments described herein and illustrated in the FIGS. 1-12. The composing cycles may include a series of iterative, simulated fusion operations performed with different fusion parameters (e.g., different stream operators, fusion constraints, fusion rule sets). As described herein, the results of a number of composing cycles may be compared, and a set of operator fusion management operations associated with positive impacts (e.g., stream application performance, desirable processing element configuration) with respect to the stream computing environment may be determined. Leveraging operator fusion management techniques may be associated with benefits including data processing efficiency and stream application performance. The method 800 may begin at block 801.

At block 810, a topology model may be built. In embodiments, the topology model may include an operator graph including a set of stream operators (e.g., topology nodes) and connections between them, together with related attributes and properties of the stream computing environment. The topology model may include a set of fusing (e.g., placement) constraints, as well as additional information such as weighted connections to indicate connections or stream operators that may be assigned greater priority. At block 820, a familial subset may be determined. As described herein, a familial subset may include one or more stream operators that are designated to be treated as a unit (e.g., co-located, placed for fusion on the same processing element). In embodiments, a feasibility check operation may be performed to verify that the topology (e.g., arrangement of elements of the topology model) achieves a solvability threshold (e.g., a fusion arrangement that achieves the specified fusion constraints can be generated). As an example, two stream operators that are designated as both co-located and ex-located may represent a conflict that fails to achieve the solvability threshold (e.g., requirement to place the stream operators separately conflicts with the simultaneous requirement to place the stream operators together).

At block 830, a composing cycle may be determined. Determining the composing cycles may include receiving a composing script string that includes instructions defining the number of composing cycles to be performed, as well as the set of heuristics (e.g., fusion constraints) to be applied for each cycle of the series of composing cycles. In embodiments, the composing script may be generated by the stream computing environment, input by a user/stream environment administrator, or selected from a template. For instance, an example composing script may include "ComposingScript=ACDB1#2#_ACD1%50%*." In embodiments, 2 cycles may be requested (e.g., "_" separates the first and second cycles), and the letters may represent specific heuristics to be used for each cycle (e.g., fusion constraints ACDB for the first cycle and fusion constraints ACD1 for the second cycle). The numeral "1" may be used for selecting which stream operator (e.g., familial subset) is to be placed in a particular processing element. The "#2#" symbol may be used for determining the starting number of containers (e.g., #n# or %50%). The "*" symbol may be used to evaluate which fusion configuration is appropriate given the set of fusion constraints (e.g., special characters may represent various fusion configuration evaluation heuristics). As such, different fusion constraints may be defined for each composing cycle to evaluate a variety of candidate fusion configurations. As an example, a first composing cycle may use an aggressive set of fusion constraints that must all be achieved (e.g., to achieve the solvability threshold). In the event that all of the fusion constraints are achieved, this fusion configuration may be used. In the event that the aggressive set of fusion constraints are not achieved, a more relaxed set of fusion constraints may be used for subsequent cycles. In certain embodiments, the fusion constraints and composing script for a set of composing cycles may be dynamically modified based on the results of a previous composing cycle, an analysis of the topology model (e.g., on-the-fly modifications/updates), host compute node configuration information, and administrator input. Other methods of determining the composing cycles are also possible.

At block 840, the composing cycles may be performed. In embodiments, performing the composing cycles may include applying the fusion constraints and heuristics defined by the composing string. The fusion constraints may be applied to establish the specified number of processing elements, as well as select the target processing elements and familial subsets for fusion. As described herein, performing the composing cycles may include simulating fusion operations for the set of stream operators based on the defined fusion constraints, and collecting information regarding the performance of the fusion configuration of each composing cycle. At block 850, the method 800 may check whether any scheduled composing cycles remain. In the event that other composing cycles remain, the method 800 may return to block 840 to perform additional composing cycles. In the event that no other composing cycles remain, the method 800 may proceed to block 860. At block 860, the result data for each composing cycle may be evaluated, and one or more composing cycles that achieve performance and efficiency thresholds may be selected. The method 800 may conclude at block 899.

Figure 9:
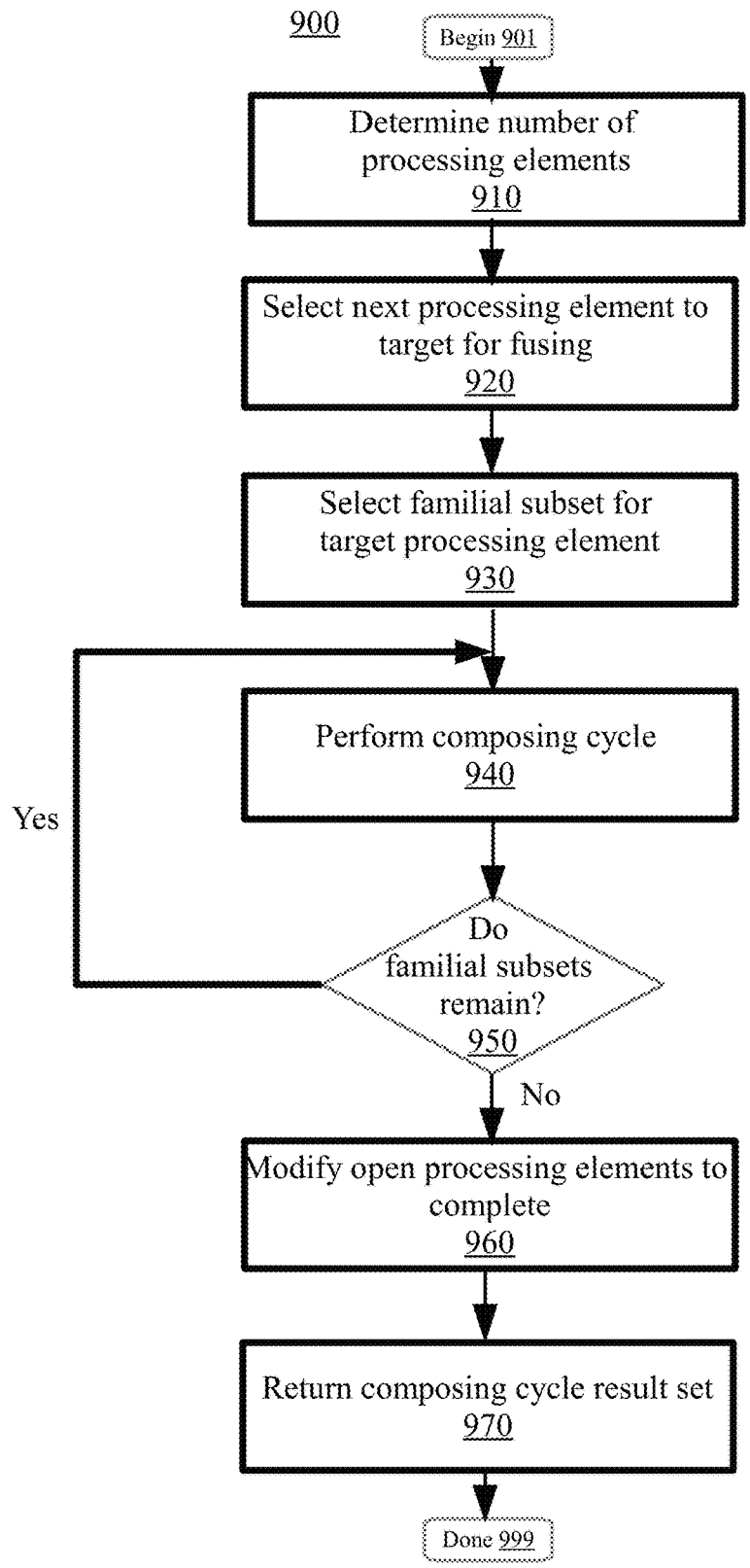
FIG. 9 is a flowchart illustrating a method for operator fusion management in a stream computing environment, according to embodiments.

FIG. 9 is a flowchart illustrating a method 900 for operator fusion management in a stream computing environment, according to embodiments. Aspects of method 900 relate to performing a number of composing cycles (e.g., fusion cycles) to determine operator fusion management operations for combining a set of stream operators into a set of processing elements. Aspects of method 900 may substantially correspond with embodiments described herein and illustrated in the FIGS. 1-12. The composing cycles may include a series of iterative, simulated fusion operations performed with different fusion parameters (e.g., different stream operators, fusion constraints, fusion rule sets). As described herein, the results of a number of composing cycles may be compared, and a set of operator fusion management operations associated with positive impacts (e.g., stream application performance, desirable processing element configuration) with respect to the stream computing environment may be determined. Leveraging operator fusion management techniques may be associated with benefits including data processing efficiency and stream application performance. The method 900 may begin at block 901.

At block 910, a number of processing elements may be determined. The number of processing elements may represent a target number of processing elements to create using the set of operator fusion management operations. In embodiments, the number of processing elements may be specified by a user or stream computing environment administrator, determined based on an amount of available system resources (e.g., available processing resources, memory resources), or determined based on a number of source/sink operators in the topology model. In certain embodiments, the number of processing elements may be adjusted downward to remove unused (e.g., empty processing elements), or adjusted upward if the fusion constraints cannot be achieved with the current number of processing elements. Other methods of determining the number of processing elements are also possible.

At block 920, a next processing element to target for fusing may be selected. In embodiments, the next processing element may be selected based on which processing element has the lower number of stream operators (e.g., to spread out/balance the number of stream operators per processing element). In embodiments, the next processing element may be selected based on which processing element has the greater number of source or sink operators (e.g., to create fusion sets that start at the endpoints of the topology model and work toward the middle). In the event that there are remaining stream operators to be assigned to a processing element but no available processing elements, a new processing element may be deployed to facilitate stream operator allocation. Other methods of selecting a next processing element to target for fusing are also possible.

At block 930, a familial subset for the target processing element may be selected. In embodiments, the familial subset may be selected based on the fusion constraints specified by the composing string. For instance, the processing element must achieve the hard constraints (e.g., inflexible parameters) required for receiving placement of the familial subset (e.g., ex-location, co-location, isolation). In embodiments, the familial subset may be selected based on which familial subset has the greater number of shared inter-connections between the familial subset and the processing element (e.g., to reduce the need for inter-communication between processing elements). Other methods of selecting the familial subset for a target processing element are also possible.

At block 940, the composing cycles may be performed. As described herein, performing the composing cycles may include simulating fusion operations for the set of stream operators and familial subsets based on the defined fusion constraints, and collecting information regarding the performance of the fusion configuration of each composing cycle. At block 950, the method 900 may check whether any familial subsets remain that have not undergone a composing cycle. In the event that other familial subsets remain, the method 900 may return to block 940 to perform additional composing cycles for the remaining familial subsets. In the event that no other familial subsets remain, the method 900 may proceed to block 960. In response to verifying that no familial subsets remain, the target processing element may be marked as complete (e.g., fused, no longer open to receive stream operator placement). At block 970, the result data for each composing cycle may be collected and returned for evaluation. The method 900 may conclude at block 999.

Figure 10:
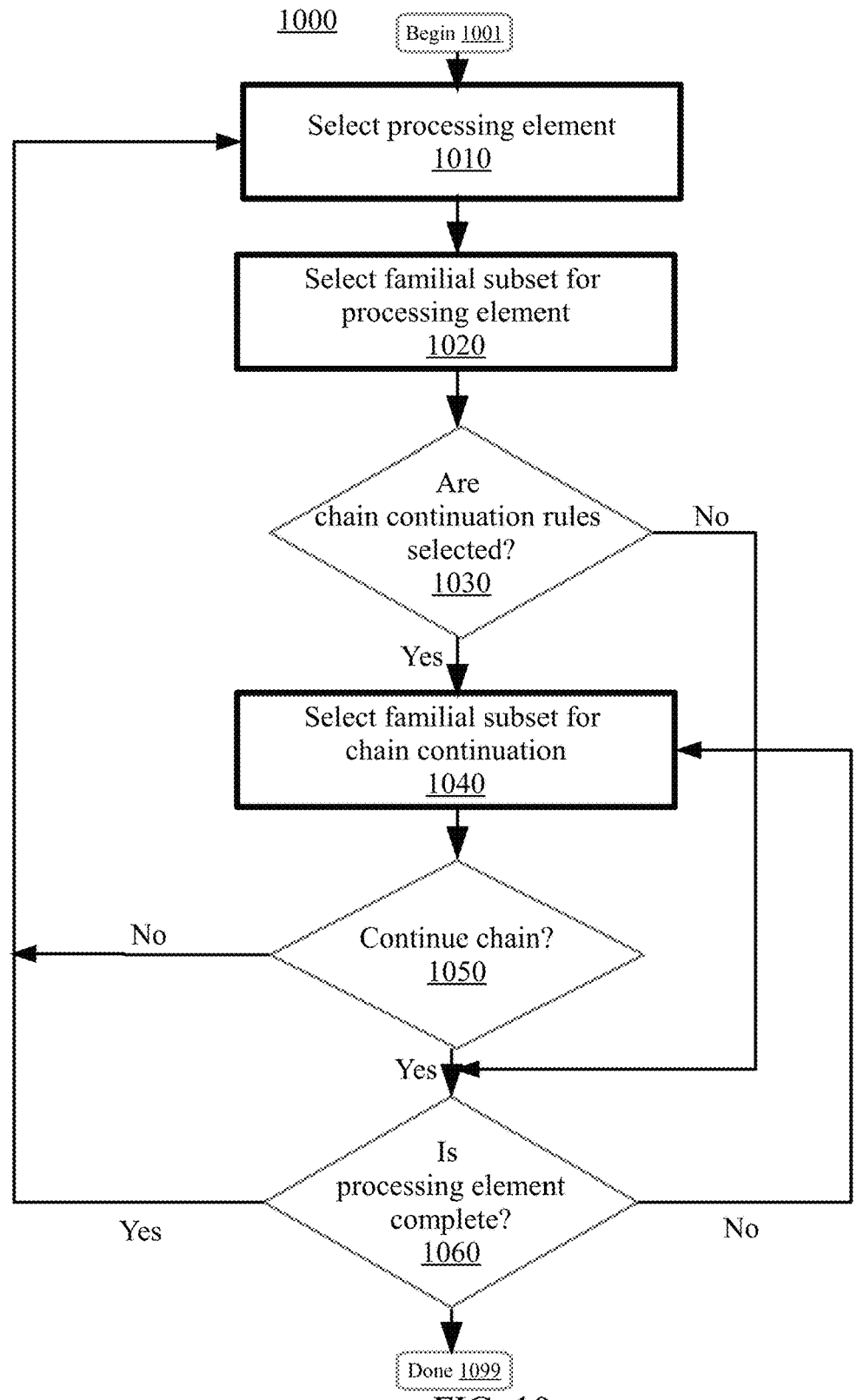
FIG. 10 is a flowchart illustrating a method for operator fusion management in a stream computing environment, according to embodiments.

FIG. 10 is a flowchart illustrating a method 1000 for operator fusion management in a stream computing environment, according to embodiments. Aspects of method 1000 relate to a method for consecutive operator placement (e.g., stream operating chaining) for placement of a set of stream operators on a set of processing elements (e.g., for fusion). Aspects of method 1000 may substantially correspond with embodiments described herein and illustrated in the FIGS. 1-12. Leveraging operator fusion management techniques may be associated with benefits including data processing efficiency and stream application performance. The method 1000 may begin at block 1001.

At block 1010, a processing element may be selected. In embodiments, the processing element may be selected to receive placement of one or more streaming elements (e.g., familial subsets). As described herein, the processing element may be selected based on the number of familial subsets hosted by the processing element, the number of source/sink operators, fusion constraints, user input, or other factors. At block 1020, a familial subset for the processing element may be selected. The familial subset may be selected based on the number of shared interconnections between the familial subset and the processing element, fusion constraints (e.g., ex-location, co-location) as well as other criteria. At block 1030, the method 1000 may verify whether chain continuation rules are selected for the given placement operation. In the event that there are no chain continuation rules selected, the method 1000 may proceed to block 1060. In the event that chain continuation rules are selected, the method 1000 may proceed to block 1040.

At block 1040, a familial subset for chain continuation may be selected. In embodiments, the familial subset for chain continuation may be selected based on a set of chain continuation rules that specify how familial subsets should be placed on the set of processing elements. For example, the set of chain continuation rules may specify a breadth-first placement method for distribution of the stream operators on multiple processing elements (e.g., spreading out stream operators on separate processing elements) or a depth-first placement method for concentrated placement of stream operators (e.g., bundle related stream operators on a single processing element until full). In embodiments, the chain continuation rules may be indicated by the set of fusion constraints. At block 1050, the method 1000 may perform a check to see whether or not the chain operation should be continued (e.g., whether or not unplaced familial subsets remain, chain continuation rules specify chain termination). In the event that the chain is not to be continued, the method 1000 may return to block 1010 (e.g., to begin for another processing element). In the event that the chain is to be continued, the method 1000 may proceed to block 1060. At block 1060, it may be determined whether or not the processing element (e.g., selected at block 1010) is complete. If the processing element is not complete, the method 1000 may return to block 1040 to select additional familial subsets for chain continuation. If the processing element is complete, the method 1000 may return to block 1010 to restart the method for a new processing element. The method 1000 may conclude at block 1099.

Figure 11:
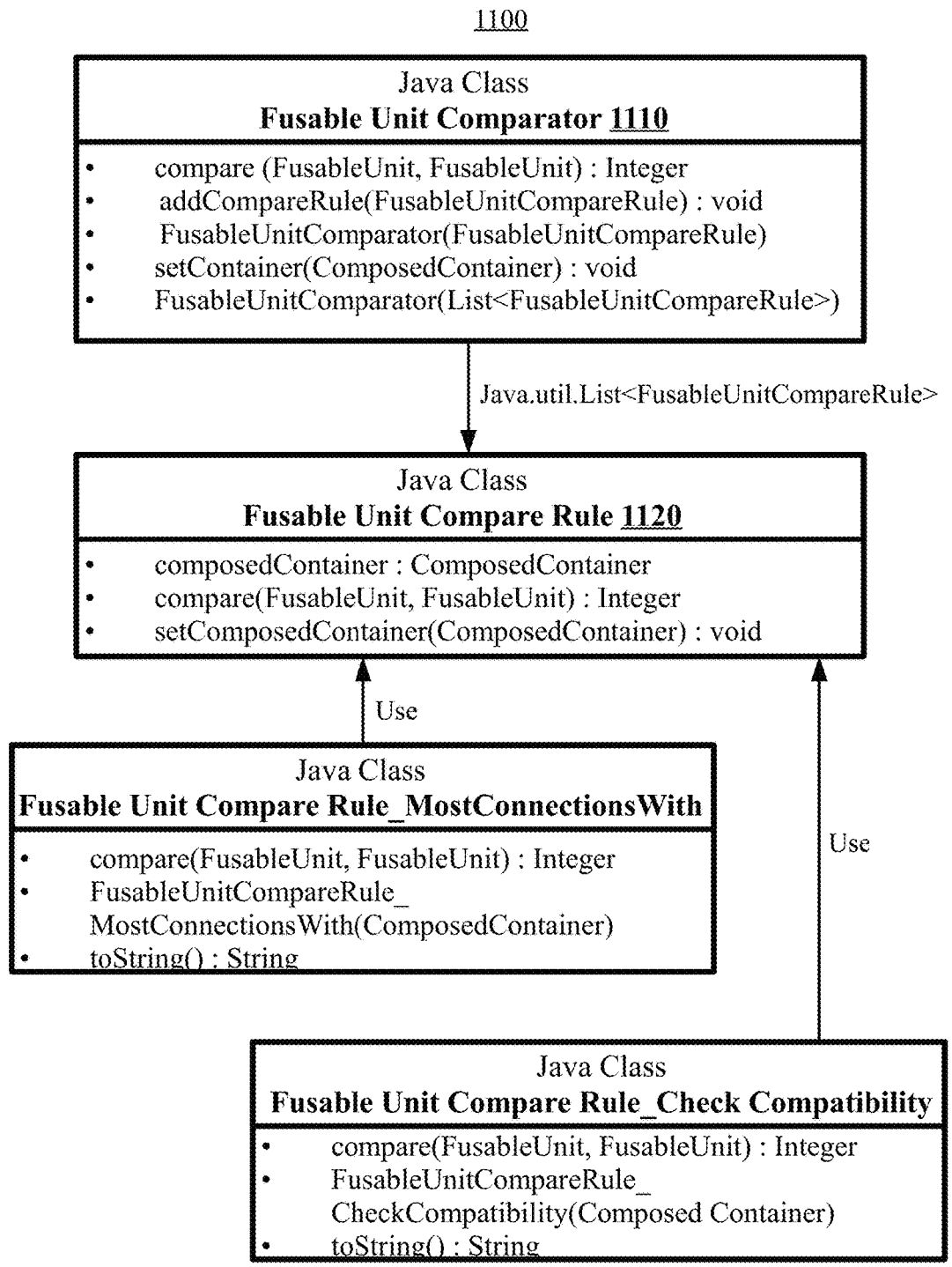
FIG. 11 illustrates a method using a heuristic based comparator mechanism for stream operation fusion management, according to embodiments.

FIG. 11 illustrates a method 1100 using a heuristic based comparator mechanism for stream operation fusion management, according to embodiments. Aspects of method 1100 to using a heuristic based comparator mechanism to select the fusable units (e.g., familial subsets, stream operators) for placement on a specified processing element using a defined list of comparative heuristics (e.g., fusion constraints). The Fusable Unit Comparator 1110 may be generated with a target Composed Processing element. The Fusable Unit Comparator 1110 may include a "compare(FusableUnit1, FusableUnit2)" operation configured to take two fusable units as parameters to compare with respect to the target processing element. In embodiments, the compare operation may be configured to return one or more of 4 possible outcomes including a null result (e.g., neither fusable unit matches the processing element), a negative number (e.g., indicating that the first fusable unit is a better match/more compatible for the processing element), zero (e.g., indicating that both fusable units are equally matches with respect to compatibility for the processing element), or a positive number (e.g., indicating that the second fusable unit is the better match/more compatible for the processing element). The compare operation may be configured to compare the fusable units using an associated list of Fusable Unit Compare Rules 1120. The Fusable Unit Compare rules may represent sub-rules that are called in order by the Fusable Unit Comparator to evaluate the selected fusable units. For instance, if a zero is returned (e.g., selected fusable units are equally compatible with respect to the processing element), the Fusable Unit Comparator may continue down the list of sub-rules until a non-zero result is arrived at. As examples, the list of sub-rules may include a "MostConnectionsWith" sub-rule (e.g., to evaluate the number of connections between the fusable unit and the processing element) and a "Check Compatibility" sub-rule (e.g., to evaluate compatibility between the processing element and the selected fusable units). Other methods of using the heuristic based comparator mechanism are also possible.

FIG. 12 is a diagram illustrating a table 1200 of example fusion constraints for stream operation fusion management, according to embodiments. Aspects of the table 1200 relate to a set of example heuristics for governing which stream operators may be placed together on processing elements for fusion. Other fusion constraints beyond those shown in table 1200 are also possible. For example, the set of operator fusion management operations may include using rules for processing element identification related to a count of fused nodes (e.g., 1_fewerFusedNodes, 2_moreFusedNodes+) or a connection factor (e.g., 3_more Connections+, 4_moreDownstreamConnections+, 5_moreUpstreamConnections+, 6_fewerConnections+, 7_fewerDownstreamConnections+, 8_fewerUpstreamConnections+). The set of operator fusion management operations may include using rules for stream operator identification related to various connections or components (e.g., B_moreAnyConnectionsWith, C_hasSourceNode, D_hasSinkNode, E_moreDownstreamConnectionsWith, F_moreUpstreamConnectionsWith, G_moreAnyConnectionsWithAnybody, H_moreFusedNodes, I_lessFusedNodes+, J_moreSinkNodes+, K_moreSourceNodes+). In embodiments, the set of operator fusion management operations may include using rules for chain continuation related to connections (e.g., M_hasAnyConnectionWith, N_hasDownstreamConnectionWith, O_hasUpDownstreamConnectionWith) or rules for fusion cycle result evaluation related to connections, processing element count, or operations per processing element (e.g., W_fewerInterConnections, X_closerToTargetPeCount, and Y_SmallerDeltaOpsPerPe+). In embodiments, the set of fusion constraints/rules described herein may be implemented within the FusableUnitComprareRule_CheckCompatibility operation (e.g., shown in FIG. 11) or specified within composing strings. Other types of rules and fusion constraints are also possible.

In addition to embodiments described above, other embodiments having fewer operational steps, more operational steps, or different operational steps are contemplated. Also, some embodiments may perform some or all of the above operational steps in a different order. In embodiments, operational steps may be performed in response to other operational steps. The modules are listed and described illustratively according to an embodiment and are not meant to indicate necessity of a particular module or exclusivity of other potential modules (or functions/purposes as applied to a specific module).

In the foregoing, reference is made to various embodiments. It should be understood, however, that this disclosure is not limited to the specifically described embodiments. Instead, any combination of the described features and elements, whether related to different embodiments or not, is contemplated to implement and practice this disclosure. Many modifications and variations may be apparent to those of ordinary skill in the art without departing from the scope and spirit of the described embodiments. Furthermore, although embodiments of this disclosure may achieve advantages over other possible solutions or over the prior art, whether or not a particular advantage is achieved by a given embodiment is not limiting of this disclosure. Thus, the described aspects, features, embodiments, and advantages are merely illustrative and are not considered elements or limitations of the appended claims except where explicitly recited in a claim(s).

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

Embodiments according to this disclosure may be provided to end-users through a cloud-computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud-computing resources are provided to a user on a pay-per-use basis, where users are charged only for the computing resources actually used (e.g., an amount of storage space used by a user or a number of virtualized systems instantiated by the user). A user can access any of the resources that reside in the cloud at any time, and from anywhere across the Internet. In context of the present disclosure, a user may access applications or related data available in the cloud. For example, the nodes used to create a stream computing application may be virtual machines hosted by a cloud service provider. Doing so allows a user to access this information from any computing system attached to a network connected to the cloud (e.g., the Internet).

Embodiments of the present disclosure may also be delivered as part of a service engagement with a client corporation, nonprofit organization, government entity, internal organizational structure, or the like. These embodiments may include configuring a computer system to perform, and deploying software, hardware, and web services that implement, some or all of the methods described herein. These embodiments may also include analyzing the client's operations, creating recommendations responsive to the analysis, building systems that implement portions of the recommendations, integrating the systems into existing processes and infrastructure, metering use of the systems, allocating expenses to users of the systems, and billing for use of the systems.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing is directed to exemplary embodiments, other and further embodiments of the invention may be devised without departing from the basic scope thereof, and the scope thereof is determined by the claims that follow. The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A computer-implemented method for operator fusion management in a stream computing environment, the method comprising:
  establishing a topology model which indicates:
    a set of stream operators,
    a set of connections between the set of stream operators, and
    a set of stream operator attributes for the set of stream operators;
  determining, based on the topology model, a set of operator fusion management operations to combine the set of stream operators into a set of processing elements, wherein determining the set of operator fusion management operations includes:
identifying a set of inflexible parameters with respect to the set of operator fusion management operations;
identifying a set of flexible parameters with respect to the set of operator fusion management operations;
configuring a set of inflexible parameter values for the set of inflexible parameters to disallow a first modification which exceeds a first threshold; and
configuring a set of flexible parameter values for the set of flexible parameters to allow a second modification within a second threshold; and
constructing, by performing the set of operator fusion management operations, the set of processing elements.

2. The method of claim 1, wherein determining, based on the topology model, the set of operator fusion management operations includes:
using a set of deployment cluster characteristics, wherein the set of deployment cluster characteristics includes both a compute host quantity factor and a compute host size factor.

3. The method of claim 1, wherein determining, based on the topology model, the set of operator fusion management operations includes:
using a fusion tightness factor.

4. The method of claim 1, wherein determining, based on the topology model, the set of operator fusion management operations includes:
using a set of application characteristics, wherein the set of application characteristics indicates: a stream operator co-location criterion, a stream operator ex-location criterion, a stream operator isolation criterion, a stream operator count, and a constraint complexity factor.

5. The method of claim 1, wherein determining, based on the topology model, the set of operator fusion management operations includes:
using a set of historical data associated with a set of parameters of the set of operator fusion management operations.

6. The method of claim 1, wherein determining, based on the topology model, the set of operator fusion management operations includes:
using a deployment cluster load factor related to a separate stream application.

7. The method of claim 1, wherein determining, based on the topology model, the set of operator fusion management operations includes:
formulating an order of operations for the set of operator fusion management operations.

8. The method of claim 7, wherein formulating the order of operations for the set of operator fusion management operations includes:
identifying, based on a processing element selection factor in response to identifying a first processing element to target for allocation with a first subset of the set of stream operators, a second processing element to target for allocation with a second subset of the set of stream operators.

9. The method of claim 1, wherein determining, based on the topology model, the set of operator fusion management operations includes:
identifying, based on a stream operator selection factor, a subset of the set of stream operators to allocate to a target processing element.

10. The method of claim 1, wherein determining, based on the topology model, the set of operator fusion management operations includes:

computing a first expected performance factor for a first fusion cycle;
computing a second expected performance factor for a second fusion cycle;
comparing the first and second expected performance factors; and
identifying, based on the first expected performance factor exceeding the second expected performance factor, the first fusion cycle.

11. The method of claim 1, further comprising:
detecting, using the topology model, a familial subset of the set of stream operators which indicates one or more stream operators that have a fusion-related mandate; and
building a single processing element that includes the familial subset of the set of stream operators.

12. The method of claim 1, wherein determining, based on the topology model, the set of operator fusion management operations includes:
calculating a number of processing elements to target using a feature which is selected from the group consisting of: a user-input, a processor proportion value, and a source-sink count.

13. The method of claim 1, wherein determining, based on the topology model, the set of operator fusion management operations includes:
resolving, with respect to an operator fusion action, a target processing element using an element which is selected from the group consisting of: a stream operator balancing criterion to balance a number of stream operators per processing element, a source-sink count to fuse stream operators which are nearer to stream limits, and a new processing element.

14. The method of claim 1, wherein determining, based on the topology model, the set of operator fusion management operations includes:
ascertaining, with respect to a target processing element, a target stream operator using a component which is selected from the group consisting of: a set of chain criteria which indicates to continue a chain of a subset of the set of stream operators, a set of fusion criteria which indicates a set of target processing element parameters for a candidate stream operator, a number of interconnections between the target processing element and the target stream operator, and achievement of a match-absence threshold which indicates a deficiency of the target stream operator.

15. The method of claim 1, wherein the establishing, the determining, and the constructing each occur in an automated fashion without user intervention.

16. The method of claim 1, further comprising:
receiving a stream of tuples to be processed by the set of processing elements operating on a pool of compute hosts; and
processing, using the set of processing elements operating on the pool of compute hosts, the stream of tuples.

17. A system for operator fusion management in a stream computing environment, the system comprising:
a memory having a set of computer readable computer instructions, and
a processor for executing the set of computer readable instructions, the set of computer readable instructions including:
establishing a topology model which indicates:
a set of stream operators,
a set of connections between the set of stream operators, and a set of stream operators attributes for the set of stream operators;

determining, based on the topology model, a set of operator fusion management operations to combine the set of stream operators into a set of processing elements, wherein determining the set of operator fusion management operations includes:
  identifying a set of inflexible parameters with respect to the set of operator fusion management operations;
  identifying a set of flexible parameters with respect to the set of operator fusion management operations;
  configuring a set of inflexible parameter values for the set of inflexible parameters to disallow a first modification which exceeds a first threshold; and
  configuring a set of flexible parameter values for the set of flexible parameters to allow a second modification within a second threshold; and constructing, by performing the set of operator fusion management operations, the set of processing elements.

18. A computer program product for operator fusion management in a stream computing environment, the computer program product comprising a computer readable storage medium having program instructions embodied therewith, wherein the computer readable storage medium is not a transitory signal per se, the program instructions executable by a processor to cause the processor to perform a method comprising:
  establishing a topology model which indicates:
    a set of stream operators,
    a set of connections between the set of stream operators, and
    a set of stream operators attributes for the set of stream operators;
  determining, based on the topology model, a set of operator fusion management operations to combine the set of stream operators into a set of processing elements, wherein determining the set of operator fusion management operations includes:
    identifying a set of inflexible parameters with respect to the set of operator fusion management operations;
    identifying a set of flexible parameters with respect to the set of operator fusion management operations;
    configuring a set of inflexible parameter values for the set of inflexible parameters to disallow a first modification which exceeds a first threshold; and
    configuring a set of flexible parameter values for the set of flexible parameters to allow a second modification within a second threshold; and
  constructing, by performing the set of operator fusion management operations, the set of processing elements.

19. The computer program product of claim 18, wherein at least one of:
  the program instructions are stored in the computer readable storage medium in a data processing system, and wherein the program instructions were downloaded over a network from a remote data processing system; or
  the program instructions are stored in the computer readable storage medium in a server data processing system, and wherein the program instructions are downloaded over a network to the remote data processing system for use in a second computer readable storage medium with the remote data processing system.

\* \* \* \* \*